(12) United States Patent
Matricardi et al.

(10) Patent No.: US 7,269,347 B1
(45) Date of Patent: Sep. 11, 2007

(54) OPTICAL RECEIVER DECISION THRESHOLD TUNING APPARATUS AND METHOD

(75) Inventors: Rocco Matricardi, San Jose, CA (US); Anthony Dunbar, San Jose, CA (US); Saurin Shah, San Jose, CA (US); Chris Barnard, Sunnyvale, CA (US)

(73) Assignee: CIENA Corporation, Linthicum, MD (US)

( * ) Notice: Subject to any disclaimer, the term of this patent is extended or adjusted under 35 U.S.C. 154(b) by 798 days.

(21) Appl. No.: 10/445,800

(22) Filed: May 28, 2003

(51) Int. Cl.
*H04B 10/08* (2006.01)
*H04B 17/00* (2006.01)

(52) U.S. Cl. .......................... 398/24; 398/27

(58) Field of Classification Search ............... 398/202, 398/206, 209, 210, 24, 27, 154; 714/704, 714/799, 751; 375/225, 340; 385/11
See application file for complete search history.

(56) References Cited

U.S. PATENT DOCUMENTS

| | | | |
|---|---|---|---|
| 5,097,486 A * | 3/1992 | Newby et al. | ............... 375/317 |
| 5,703,711 A | 12/1997 | Hamada | |
| 5,805,641 A * | 9/1998 | Patel | ........................... 375/317 |
| 5,923,462 A | 7/1999 | van der Plaats | |
| 5,963,599 A * | 10/1999 | Curtis et al. | ................. 375/341 |
| 5,986,783 A | 11/1999 | Sharma et al. | |
| 6,038,063 A | 3/2000 | Tsuda et al. | |
| 6,163,399 A | 12/2000 | Berg | |
| 6,178,213 B1 * | 1/2001 | McCormack et al. | ....... 375/355 |
| 6,198,571 B1 | 3/2001 | Yang | |
| 6,304,347 B1 | 10/2001 | Beine et al. | |
| 6,331,906 B1 | 12/2001 | Sharma et al. | |
| 6,341,034 B1 | 1/2002 | Sun et al. | |
| 6,342,959 B1 | 1/2002 | Haxell et al. | |
| 6,407,854 B1 | 6/2002 | Shum | |
| 6,549,513 B1 | 4/2003 | Chao et al. | |
| 6,567,194 B1 | 5/2003 | Badr | |
| 6,907,197 B2 * | 6/2005 | Heath et al. | ................... 398/26 |
| 6,980,737 B1 * | 12/2005 | Anslow et al. | ............... 398/27 |
| 7,010,180 B2 * | 3/2006 | van Wijngaarden et al. | .. 385/11 |
| 7,058,315 B2 * | 6/2006 | Brewer et al. | .............. 398/202 |
| 2004/0208538 A1 * | 10/2004 | Liwak | .......................... 398/45 |

* cited by examiner

*Primary Examiner*—Jason Chan
*Assistant Examiner*—Quan-Zhen Wang
(74) *Attorney, Agent, or Firm*—Clements Walker; Lawrence A. Baratta, Jr.; Tyler S. Brown

(57) ABSTRACT

A method of controlling an optical signal receiver utilizes three control loops: a first control loop tunes the decision threshold of the receiver when the optical network is in a substantially steady state and a second control loop rapidly switches to a reference decision threshold upon the occurrence of an alarm condition. The invention rapidly switches to a predetermined reference decision threshold to compensate for optical signal changes in eye Q and received power after a protection switch or traffic reroute. After a protection switch, a slower tuning algorithm is used to adjust the decision threshold to a more optimum value. In the third control loop, the optical signal receiver may utilize a peak detector that detects the optical signal peak and a potentiometer that is commanded by a controller to output a commanded percentage of this peak value to adjust the threshold and thereby respond to transients.

30 Claims, 17 Drawing Sheets

OPTICAL RECEIVER DECISION THRESHOLD TUNING APPARATUS AND METHOD

BACKGROUND OF THE INVENTION

1. Field of Invention

The present invention relates in general to receivers and methods of receiving for communication systems and, in particular, to an optical signal receiver and optical signal receiving method including decision threshold adjustment.

2. Description of Related Art

It is well known that signals transported over optical communication networks suffer degradation between associated transmitters and receivers. Signal degradation may result from a variety of system parameters including the total transmission distance, the transmission fiber type, the number of optical amplifications to a signal, the number of system channels, etc.

Optical networks are, however, being developed with ever-increasing signal transmission speeds and distances. Channel counts have also been increasing in wavelength division multiplexed transmission systems. The greater transmission distances, speeds and higher channel counts directly effect received signal quality.

To maintain high fidelity signal reception in optical networks, advances in receiver design have been proposed. For example, receivers are constructed with the goal of achieving an acceptable BER (bit error rate), which is the ratio of the number of incorrectly received bits to the total number of received bits. Typically, this is achieved by adjusting and fixing the decision threshold of a comparator within the receiver while providing a well-known optical test signal at the comparator data input. The decision threshold is a reference voltage against which the strength of a received signal is compared. If the received signal is above the decision threshold, it is interpreted as being "on", but if the received signal is below the decision threshold, it is interpreted as being "off".

It is also known that a decision threshold may be established from the eye diagram of the received signal. An exemplary eye diagram is illustrated in FIG. 1a which is also useful for understanding the basic concept of a decision threshold for an optical signal (aka "slicing level").

In general, an eye diagram may be observed on an oscilloscope by monitoring the receiver data output voltage on the vertical input of the oscilloscope and triggering on the data clock. Key features of an eye diagram, as illustrated in FIG. 1a, include the crossing points C1, C2, useable eye width (i.e. the time distance on the horizontal scale between points C1 and C2) and usable eye height H (voltage).

In an ideal received signal such as the one shown in FIG. 1a, the crossing points C1,C2 would be centered and symmetrical, and the open area would be as large as possible, indicating strong pulse width and height in the received signal. A decision threshold DT may be selected to correspond with the voltage level at the crossing points C1, C2, as shown.

A difficulty with such receiver designs, however, is that the eye diagram itself depends on all of the above-mentioned parameters that effect signal quality. All these parameters can change with time, e.g. due to system upgrades to add more channels, changes in fiber plant, or changes in optical amplifier performance. Such changes can alter the received "eye diagram" leading to a degradation of the BER in the absence of a re-optimized decision threshold.

In an attempt to minimize the adverse effects of system changes and generally increase effective transmission distances through greater error tolerance, error correction schemes such as forward error correction (FEC) have been incorporated into receiver designs. FEC generally includes generation of a control code at the transmission site. The control code is transmitted with the data to a receiver. Error correction may be achieved based on various algorithms that compensate for specific detected errors in the control code. Although FEC schemes have achieved wide acceptance, there is room for improvement in basic receiver design that addresses the underlying BER variation resulting from changes in system parameters.

In amplified optical transmission systems such as DWDM (dense wave division multiplexed) rings, many channels share the same optical amplifier even though each channel may traverse different optical paths and have different source and termination points. Such a multi-channel optical amplifier is quite well known (e.g. an erbium doped fiber amplifier) and is considered an enabling technology of WDM systems. One problem is that channels passing through the same optical amplifier must share the same gain medium of the optical amplifier. Changes in the signal level of one or more channels going through the amplifier impact the other channels to some degree since they share the same gain medium.

In order to limit the impact on the other channels, optical amplifiers can be designed and operated in various modes. One of the well-known techniques is to operate the amplifier in gain control mode so that the gain of the amplifier is kept constant regardless of total input power coming in to the amplifier. In this way, the output power for other channels not directly impacted by input power level changes can be kept constant. This concept can be best described with reference to FIGS. 1b-g.

As shown in FIG. 1b, the optical amplifier (amp) in the NE2 (network element 2) is shared by two optical channels, one channel going from NE1 to NE3 and second channel being optically muxed going from NE2 to NE3. In other words, separate transmitters (Tx1 and Tx2) inject separate optical channels into different locations of the optical fiber of the network as is well-known in the art.

FIGS. 1c and 1d show the average optical receiver power seen by two receivers (Rx1 and Rx2, respectively) when the network is in steady state.

FIG. 1e illustrates the same network as FIG. 1b except that there is a failure in channel 1 (indicated by a large X between NE1 and NE2). The illustration is most indicative of a fiber cut but there are a variety of circumstances that can lead to the failure of a subset of the channels being amplified by a common amplifier. In terms of channel 1 failing, these circumstances include, but are not limited to, laser on Tx 1 malfunctions, someone mistakenly either removes the circuit pack containing Tx 1 from the chassis, somebody removes a fiber patch cord connected to the Tx 1, the amplifier on the NE1 either malfunctions or is removed by mistake (or removed for some other purpose such as upgrade or maintenance), a power outage on the NE1 causes the Tx 1 and/or amplifier to shut down, a fiber cut between NE1 and NE2. Any of the above events will cause the channel 1 power to fall to zero. Thus, the amplifier in NE2 will also suddenly see half as much power (channel 1 now zero, channel 2 still present).

In other words, a fiber cut between NE1 and NE2 causes the power of channel 1 to drop to zero. As a result, the received power level of channel 1 also drops close to zero (see FIG. 1f). If the amplifier located at NE2 is in a gain mode (as it normally would be), when the power of channel 1 disappears there is extra energy available which causes the gain of the channel 2 to go up for a short amount of time at least until conventional optical and electrical control loops in the amplifier can react to bring the gain to the same level as before for channel 2. One can improve the time scale necessary to remove the extra energy available from the amplifier by designing faster amplifier control loops; however, it can't be completely eliminated. Commercially-available, state-of-the-art amplifiers can react to the changes in channel 1 provided the changes occur with time scale that is much larger than few hundred microseconds. However, some of the events described above can cause the channel 1 to drop within 20 to 50 microseconds. As shown in FIG. 1g, the average received power of channel 2 (as seen by receiver Rx2) exhibits a rapid increase followed by rapid decrease to its steady state value. Such a large transient is quite typical of conventional optical networks.

Moreover, there is a snowball effect in optical networks due to the amplifier chain. The transient signal (both the amplitude and speed of the change) increases as more and more amplifiers are cascaded. In other words, the transient snowballs as it is successively amplified by a chain of amplifiers (e.g. between NE2 and receiver in the example discussed above).

In the example discussed above in relation to FIGS. 1b-g, a customer receiver that is receiving channel 2 (going between NE2 and NE3) should not be negatively affected when another channel in the network (e.g. channel 1 in the example) fails. Nevertheless, such a traffic impact may very well occur as these kind of network events cause the receiver power as well as optical signal to change rapidly at the receiver.

Moreover, optical networks are becoming more and more dynamic in their traffic configurations. For example, various forms of protection switching exist in order to compensate for problems such as a fiber break or equipment failure. As is known, protection switching may reroute the optical signal along an alternative path. In addition, optical signal traffic may need to be rerouted due to other concerns such as equipment maintenance, upgrades, and traffic load balancing. Both protection switching and signal rerouting cause what is variously referred to herein as a "channel-disrupting transient" or alarm condition that directly affects the channel being switched or rerouted.

The result of such protection switching and traffic rerouting is that the optical signal suddenly traverses a much longer (or perhaps shorter) distance and experiences a much greater (smaller) attenuation and distortion than before. In other words, after the receiver loses the signal, it will be restored along a different path with a different OSNR (optical signal to noise ratio), received power, and eye quality. The receiver must be able to adjust to those differences and detect the protection signal within the time scale dictated by the standards of the transmitted signal. Standards such as SONET and SDH provide for a 50 ms recovery time for a protection switch event. Thus, there is a time window of 50 ms for the traffic to be rerouted and for the system to recover to the point where the rerouted signal may be received with an acceptable BER.

While such a protection switch recovery time is quite useful for the channel being rerouted, it does not help the other unswitched channels. As explained above, the sudden absence of one channel (e.g. Channel 1) in an amplifier simultaneously amplifying plural channels (e.g. Channels 1 and 2) will cause a non-channel-disruptive transient in the other channels (Channel 2 in the example). Channel 2 is provided no such recovery time and the receiver for channel 2 must continue to receiver Channel 2 with an acceptable bit error rate. Thus, there is a need in the art for an improved optical receiver to handle situations like those faced by Channel 2 (e.g. in general terms, a transient caused by a sudden change in different channel that causes all commonly amplified channels to experience a transient).

Moreover, conventional systems utilize a fixed threshold that does not change in response to a large transient such as that resulting from a protection switch event. The fixed threshold is chosen to have sufficient margin to guarantee end-of-life performance (e.g. from laser aging). Such a fixed threshold is essentially a poor compromise for optimal performance and has significant impacts on the link budget thereby making it very difficult for high bit rate channels to be accommodated (nonlinear optical signal distortions typically increase with bit rate).

Accordingly, there is a need in the art for optical receiver configuration and/or optical signal control method that adjusts the receiver decision threshold to reduce the BER. In addition, there is a need in the art of adjusting the receiver decision threshold in a way that can adapt to both fast and slow network changes and achieve an acceptable BER within these different time scales.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Furthermore, the terms "optimal", "optimize" and the like do not necessarily refer to the absolute optimum. Instead, these terms reflect the invention's goal of approaching the absolute optimum. It is to be understood that an absolute optimum point, like much else in life, is nearly impossible to achieve and that the invention is not limited to such a strict interpretation.

Figure 1A:
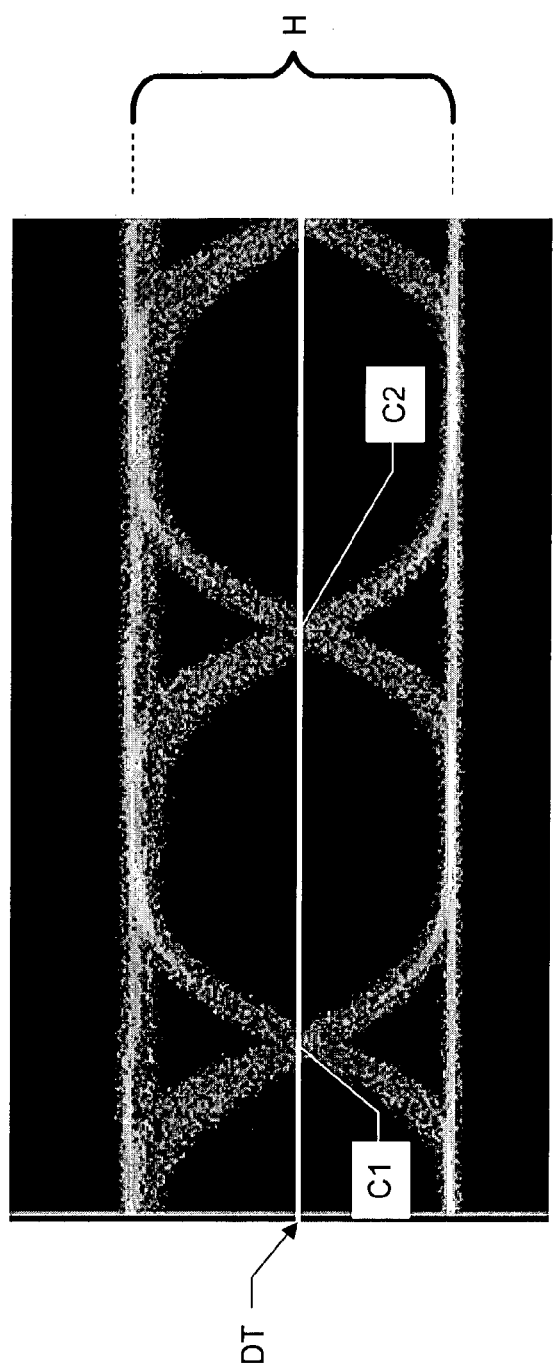
FIG. 1a is a conventional eye diagram illustrating the general concept of a decision threshold in an optical receiver.
Figure 1B:
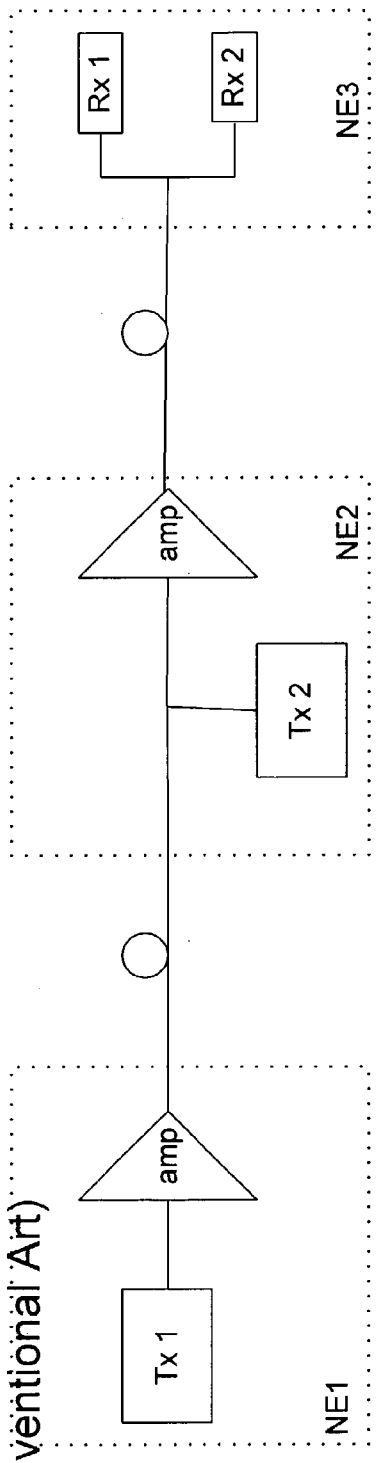
FIGS. 1b, 1c, and 1d respectively illustrate a conventional two-channel optical network, received power of channel 1, and received power of channel 2 for the conventional network in a steady-state condition which is useful for illustrating transient signal conditions that may be compensated by the invention.
Figure 1C:
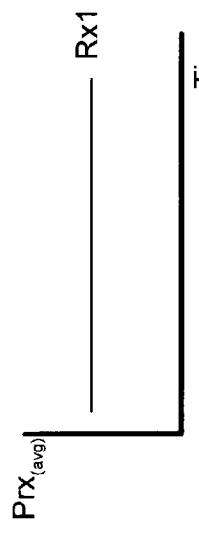
Figure 1D:
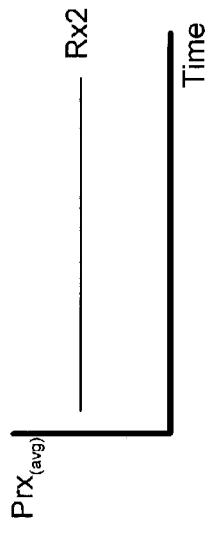
Figure 1E:
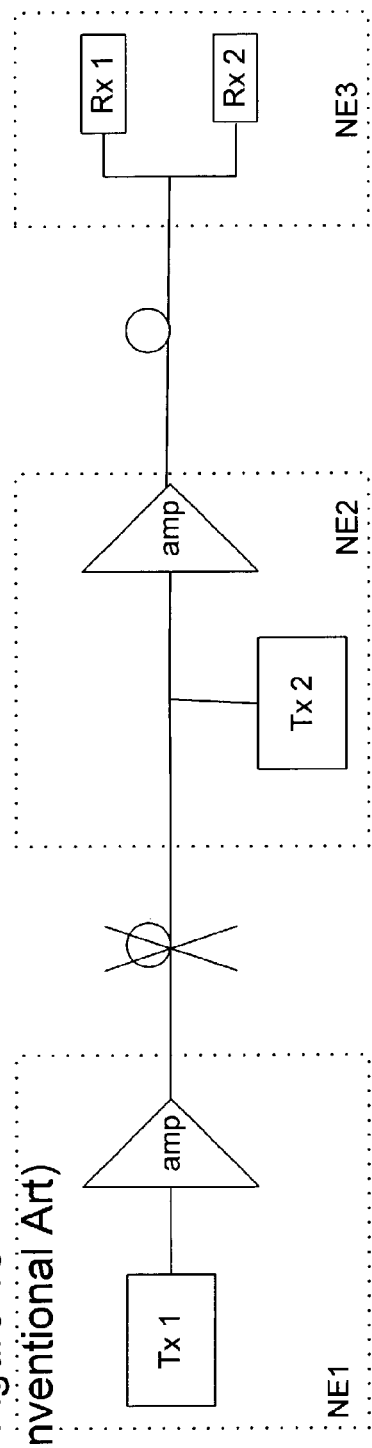
FIGS. 1e, 1f, and 1g respectively illustrate a conventional two-channel optical network, received power of channel 1, and received power of channel 2 for the conventional network in which a fiber cut for channel 1 causes a large transient in the other channel (2), such transient may be compensated by the invention.
Figure 1F:
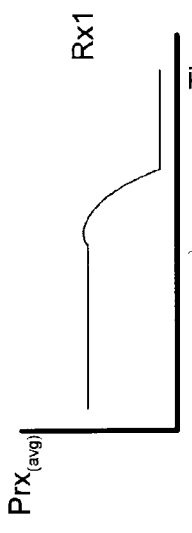
Figure 1G:
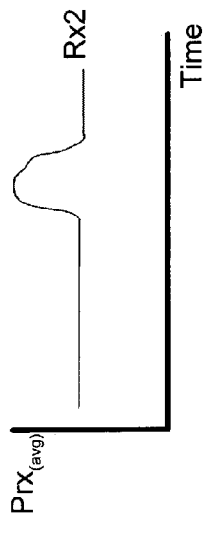
Figure 2:
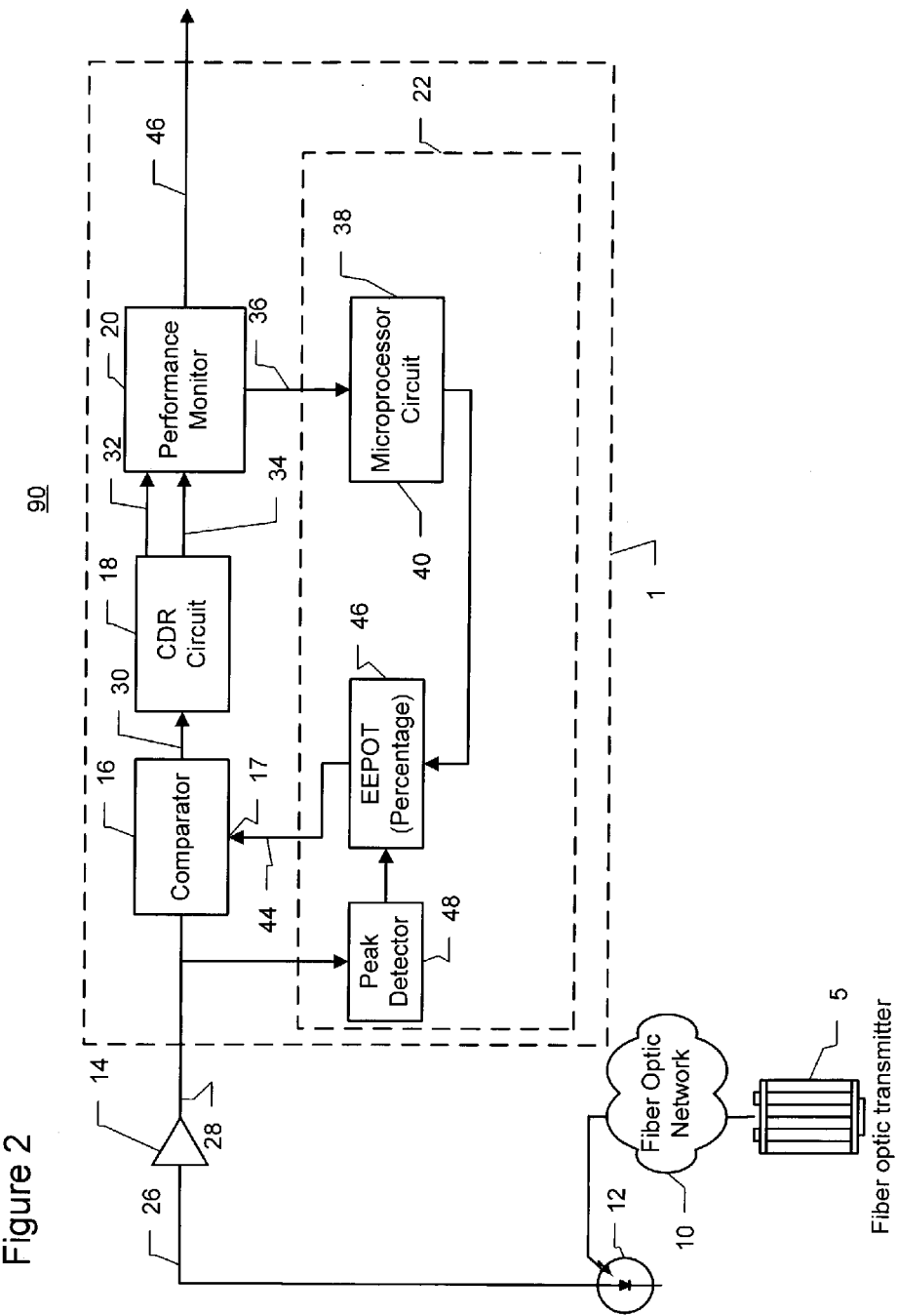
FIG. 2 is a high-level block diagram of a first embodiment of the inventive optical receiver.

FIG. 2 illustrates an exemplary embodiment of a receiver circuit 1 consistent with the invention. The optical signal receiver circuit 1 is typically installed in a fiber optic system 90 as shown but it may also be located in a variety of other configurations as explained below. The fiber optic system 90 illustrated in FIG. 2 includes a fiber optic transmitter 5 that sends an optical signal to a photodetector 12 via a fiber optic network 10. Various examples of the fiber optic network 10 are presented below and explained with reference to FIGS. 4-10. The inventive operation may vary depending upon the type of fiber optic network 10 to which the optical receiver circuit 1 is connected.

The transmitter 5, fiber optic network 10 and photodetector 12 are conventional elements in and of themselves and may be constructed in a variety of manners as is known in the art. Nonlimiting examples of a photodetector 12 include a APD (avalanche photodiode) and a PIN (Positive-Intrinsic-Negative) photodiode.

The type of transmission modulation utilized by the transmitter 5 is not limited by the invention as the modulation is independent of error coding and performance monitoring. For example, the invention may use "on"/"off" keying (OOK, also known as non-return to zero) for modulation whereby an optical pulse is transmitted in the "on" state—signaling a logical "1"—and the absence of the pulse corresponds to the "off" state—signaling a logical zero. Other modulation formats include RZ (return-to-zero), soliton, and CSRZ (carrier suppressed return to zero).

The optical signal from transmitter 5 is received by photodetector 12 and converted thereby into an analog electrical signal. Of course, other elements may be used in place of or in conjunction with photodetector 12 to perform this O/E (optical-to-electrical) signal conversion. One example is the conventional TIA 14 (transimpedance amplifier) that may be utilized to convert the current signal from the photodetector 12 to a voltage signal appropriate for later processing. Another example, is a limiting amplifier (not shown) which is an optional component whose intended purpose is to amplify and limit the signal from the photodiode 12 to a level that is appropriate for coupling to the receiver circuit 1 components.

As shown, the receiver circuit 1 may include a comparator 16 coupled to the output of the TIA 14; a clock and data recovery (CDR) circuit 18 coupled to the output of the comparator 16; a performance monitor 20 coupled to the output of the CDR circuit; and a control circuit 22 coupled to an output of the performance monitor 20.

The receiver circuit 1 may also include a peak detector 48 coupled to the input of the receiver 1. A nonlimiting example of a peak detector is a rectifier but those of ordinary skill will recognize that there are many ways to build a peak detector 48 to detect the peak value of the input signal. An EEPOT 46 (Electrically Erasable Potentiometer) is coupled to the peak detector 48. The EEPOT 46 is also coupled to the decision threshold input port 17 of the comparator 16 and to the microprocessor circuit 40. The EEPOT 46 may be commanded by the microprocessor circuit 40 to output a control signal on line 44 that is a commanded percentage of the input signal (the peak signal value from the peak detector 48).

Those skilled in the art will recognize that there are other hardware implementations besides an EEPOT, that will perform its function. One example of such an alternative is shown in FIG. 3*b* which illustrates replacing the EEPOT with a multiplying DAC (digital to analog converter) 47. Multiplying DACs such as element 47 are off-the-shelf components that multiply an analog input signal by an D/A converted control signal. In this case, the multiplying DAC 47 multiplies the analog peak value from peak detector 48 by the D/A converted commanded percentage signal from the microprocessor circuit 40. Because the functionality is so similar, the multiplying DAC 47 is considered an equivalent to the EEPOT 46 described in detail herein and all descriptions relating to the EEPOT 46 apply with equal force to the multiplying DAC 47.

As explained in more detail, the general function of the peak detector 48 and EEPOT 46 is to provide a "fixed" fractional voltage level as a function of the input signal amplitude. Since the peak detector 48 and EEPOT 46 are hardware components, the hardware control loop formed thereby operates on a much faster time scale than would otherwise be possible with software optimization control loops. In other words, the peak signal value from peak detector 48 is essentially an instantaneous peak level that is almost instantaneously available to the EEPOT 46 which just as rapidly takes a percentage of the peak value and outputs the result as the decision threshold to the comparator 16 on line 44. In this way, the inventive receiver 1 can very rapidly respond to transients as they occur. A large transient will cause the peak detector 48 to output a correspondingly large peak value, a percentage of which is used as the slicing level (decision threshold) for the comparator 16 which is now able to accurately slice the large incoming transient peak into binary values.

The microprocessor circuit 40 may be constructed from, for example, a general purpose microprocessor, an application specific integrated circuit (ASIC), a field programmable gate array (FPGA), etc.

In general, the control circuit 22 (controller) provides a decision threshold signal to the comparator 16 on line 44 and may dynamically adjust the decision threshold by maintaining a percentage-of-peak decision threshold and by adjusting the percentage amount according to the inventive hardware and algorithms disclosed herein.

Although the illustrated embodiment includes particular circuit elements, those skilled in the art will recognize that a receiver consistent with the invention may have a variety of configurations. For example, the TIA 14 may be omitted or replaced by other elements in a particular receiver Furthermore, the CDR circuit 18 and comparator 16 may be packaged together as is known. It is to be understood, therefore, that the illustrated exemplary embodiment is provided only by way of illustration, not of limitation.

With continued reference to FIG. 2, in a manner well known to those skilled in the art, the photodiode 12 converts an optical signal impinging thereon into an analog electrical signal on line 26. The conventional and optional TIA 14 amplifies the signal from the photodiode to a level that is appropriate for coupling to the remainder of the receiver circuit 1 components. The analog output of the amplifier 14 is coupled to the data input of the comparator 16 as well as to the peak detector 48.

The function of the comparator 16 is well known to those skilled in the art. Generally, the comparator receives an analog data input on line 28, and a decision threshold input on line 44. One exemplary way to build a comparator 16 is with a differential amplifier in which the decision threshold is essentially a DC bias against which the input signal is compared.

The control circuit 22, in a manner to be described in detail below, generates the decision threshold, which is coupled to the comparator decision threshold input port 17 on line 44. The comparator 16 outputs a digital "1" if the received data input signal on line 28 is above the voltage level of the decision threshold on line 44, and outputs a digital "0" if the received signal is below the decision threshold. In this manner, the data stream in the optical input signal is reconstructed as a digital electrical signal at the output of the comparator 16 on line 30.

In the illustrated exemplary embodiment, the output of the comparator 16 is coupled to a conventional clock and data recovery circuit 18 (CDR) that recovers the clock and data from the received input on line 30. Those skilled in the art will recognize that this function may be accomplished in a variety of ways, e.g. using a phase locked loop, saw filter, etc. In the illustrated embodiment, the clock and data are provided on separate outputs 32,34 of the CDR 18 and are coupled to the performance monitor 20.

The performance monitor 20 may take a variety of forms including a convention FEC (forward error correction) circuit that detects bit errors and corrects them using known forward error correction algorithm(s). If the performance monitor 20 is constructed with an FEC circuit, it is preferred that the error data supplied to the microprocessor circuit on line 36 includes the number of corrected "1"s and the number of corrected "0"s. Conventional FEC circuits include outputs appropriate for this purpose.

In a configuration where an FEC circuit is not necessary or desired, those skilled in the art will recognize other configurations of the performance monitor 20. For example, data stream errors can be obtained from other error detection or error correction codes. The performance monitor 20 may also be constructed with a conventional SONET or SDH performance monitor capable of at least detecting bit errors in the optical signal. For example, a SONET or SDH performance monitor may utilize the B1, B2, or B3 parity bytes included within the overhead of the converted optical signal in order to detect bit errors. In this case, since the total error count is available (it is not broken down into corrected "ones" and "zeros"), an algorithm must determine the proper direction based on whether the number of errors are increasing or decreasing.

The parity checking on the received signal can also determine if the received signal has degraded or failed (an alarm condition). When a loss of signal is detected, it triggers a protection switch in the network. As explained in more detailed below, a protection switch is an important event that the present invention recognizes and utilizes as a trigger to adjust the decision threshold. In fact, the invention is designed to minimize the recovery time from a protection switch, since the switching time is limited by protocols such as SONET.

In general, the performance monitor 20 may provide error data and/or protection switch notification to the microprocessor circuit 40 on line 36. The error data is representative of the number of bit errors received in the input data stream, and may be provided in a variety of forms, e.g. total number of received errors, numbers of corrected bits. In one preferred embodiment, the error data should preferably convey the number of corrected "1"s and the number of corrected "0"s.

The error signal and/or protection switch notification from the performance monitor 20 is coupled to the control circuit 22, which provides a decision threshold to the comparator 16 on line 44 based on or in response thereto.

In the illustrated exemplary embodiment shown in FIG. 2, the error signal on line 36 is coupled to an input of a microprocessor circuit 38. The microprocessor 40 executes a methodology (explained below) to provide digital output to EEPOT 46 for modifying the output of the EEPOT 46 that, in turn, is provided as the comparator decision threshold on line 44. More specifically, the EEPOT 46 receives the peak signal value from the peak detector 48 and outputs a control signal on line 44 that is a percentage of the peak signal value. The percentage amount is commanded by the microprocessor circuit 40.

Of course, if the comparator 16 were capable of receiving a digital threshold signal then the EEPOT 46 could be eliminated and the microprocessor circuit 40 could input the peak value from peak detector 48 and directly output a digital threshold signal to the comparator 16.

Figure 3:
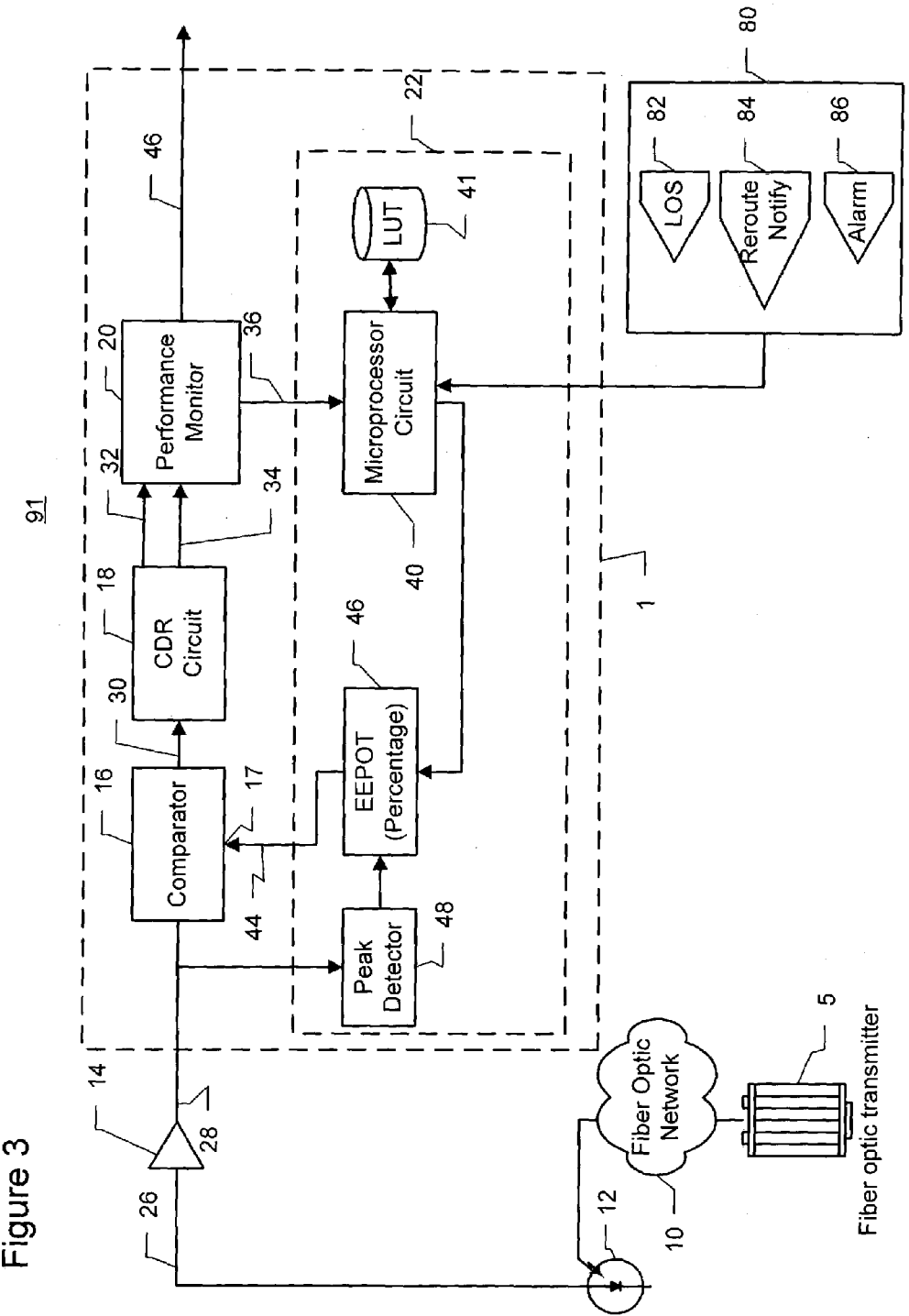
FIG. 3 is a high-level block diagram of a second embodiment of the inventive optical receiver.
Figure 3B:
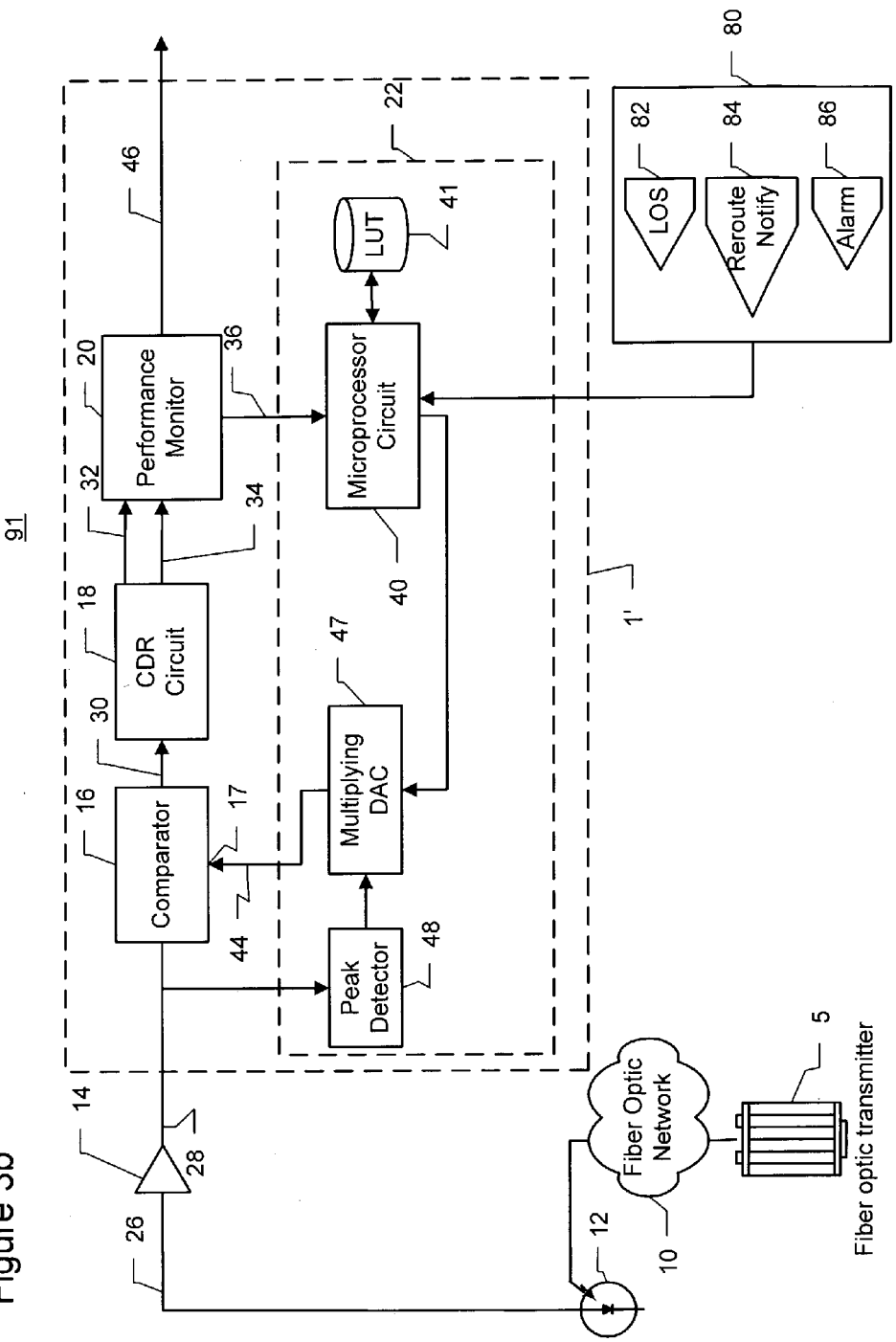
FIG. 3b is a high-level block diagram of a third embodiment of the inventive optical receiver.

As shown in FIG. 3, the microprocessor 40 may also receive a LOS 82 (loss of signal) declaration (which is an "alarm condition" in the invention) from the performance monitor, CDR, or a port 80. The LOS port 80 transmits a LOS declaration from another device (not shown). Such other devices may include an NCP (network control processor), node controller, network manager, or other device capable of recognizing a LOS event and transmitting a LOS declaration to the LOS port 80. Examples include a comparator that compares the optical signal strength of the optical signal against a predetermined threshold: if the optical signal power falls below the threshold a LOS event may be declared and the microprocessor notified via port 80.

The port 80 may also receive an alarm signal 86 from another device such as a conventional NCP, node controller, or network manager. Such controllers and managers typically use a conventional in-band or out-of-band service channel or perhaps an overlay IP network to communicate network status information, control signals, alarms and/or OAM&P (operation administration maintenance and provisioning signals) among the various nodes.

In another alternative, the port 80 may receive a reroute notification signal 84 (another example of a alarm condition or channel-disrupting transient) from another device such as an NCP, node controller or network manager. This is particularly applicable to an optical mesh network in which optical network traffic may be rerouted for a variety of different reasons such as fiber cut, node outage, traffic demands, etc.

Furthermore, the port 80 may receive the LOS declaration 82, reroute notification 84 and/or alarm signal 86 via a conventional service channel. Service channels are typically used to convey various information about the optical network and there are a variety of examples of such service channels and associated architectures. One example uses a distinct wavelength of a WDM (wavelength division multiplexed) system to convey the service channel. The service channel wavelength may be selected from the data signal and routed to the LOS port to thereby transmit the LOS declaration from any of the components of the optical network. Further details of LOS declaration processing are described below in the operation section.

FIG. 3 also illustrates another aspect of the alternative embodiment shown therein. Namely, a LUT (look up table) 41 may be connected to the microprocessor 40 and used to store a table of reference decision threshold values. The use of this table is explained below in the operation section. The LUT 41 may be constructed with a conventional memory device.

Figure 4:
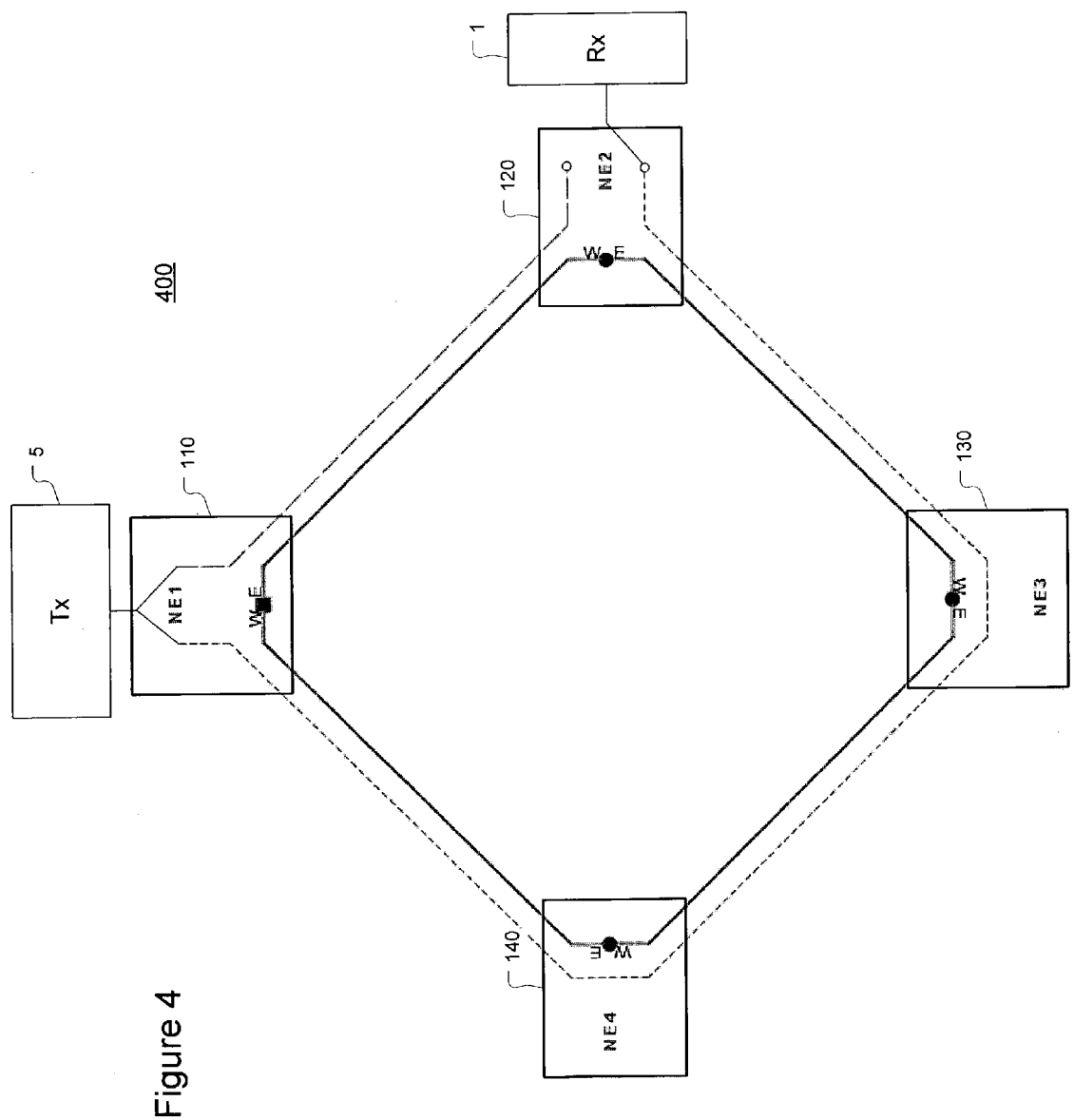
FIG. 4 is a very high-level block diagram showing a UPSR network in an un-switched state and to which the inventive optical receiver may be connected.

FIG. 4 illustrates a first example of an optical network to which the inventive optical receiver 1 may be connected. This but one example of a UPSR (unidirectional protection switched ring) system architecture 400 and possible location for the inventive receiver node 10.

System architecture 400 is an example of a UPSR ring network. The UPSR ring network 400 includes a plurality of network elements 110, 120, 130, 140 each of which may include, for example, an OADMs (optical add drop multiplexer) that adds and drop channels on the network 400. The network elements 110-140 are interconnected in a ring configuration with individual spans or lengths of optical fiber.

UPSR networks are, in and of themselves, quite conventional. Indeed, Bellcore has set forth requirements and standards in, for example, Chapter 3 of Bellcore's GENERIC REQUIREMENTS GR-1400-CORE, Issue 1. In general, a UPSR is a network for connecting a plurality of nodes by using transmission lines to form a ring wherein each two nodes thereof are connected by two paths: a working path and a protection path.

FIG. 4 is a simplified diagram showing an example of a UPSR network 400 that is useful for illustrating concepts of the invention. The solid line indicates a working path and the dashed line indicates the protection path. The general theory of operation is that the optical signal from a transmitter such as optical transmitter 5 is split and sent around both the working and protect paths. At the receiver node such as network element 120, the strongest or highest quality signal is selected. Because the signal travels diverse pathways to reach the receiver, a fiber cut or node failure on one path can be easily remedied by switching to the other path. Since signals from both pathways are immediately available, the switchover may be rapidly performed which is a key advantage to UPSR networks.

Figure 5:
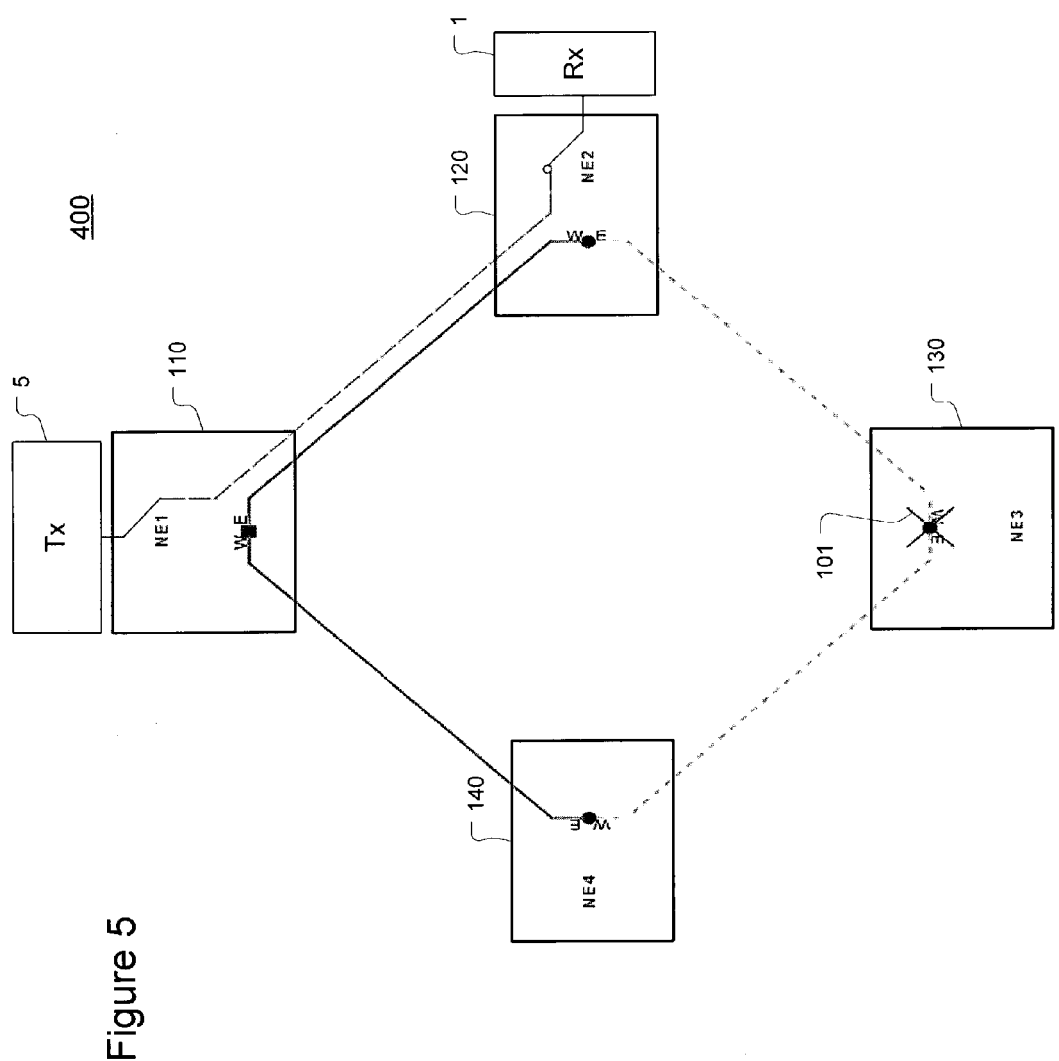
FIG. 5 is a very high-level block diagram showing a UPSR network in an switched state and to which the inventive optical receiver may be connected.

FIG. 5 illustrates a node failure or fiber cut 101 in the UPSR network 400. The network element 120 receiving the optical signal from transmitter 5 detects the signal failure (alarm condition) on the working path and switches over to the protection path. FIG. 5 shows the result of this switchover.

Note that this switchover results in a much shorter optical signal pathway for the optical signal (instead of traversing clockwise and through two network elements 140 and 130 and the attendant connection fibers, the signal now traverses a single fiber span). The result is that the eye quality changes significantly in a very short time period. In this way, a large transient will occur in response to the protection switch event. For example, an optical circuit before a fiber cut may have a distance of 10 km between transmitter and receiver with a received power of −8 dBm and OSNR of 30 dB. After fiber cut, the optical signal pathway may increase to 200 km resulting in received signal power of −15 dBm and OSNR of 25 dB. SONET and SDH specify a switch time of less than 50 ms which is very little time to recover from such a large transient.

As explained below, the protection switch event is one of several such triggers (alarm conditions) for the inventive method.

Figure 6:
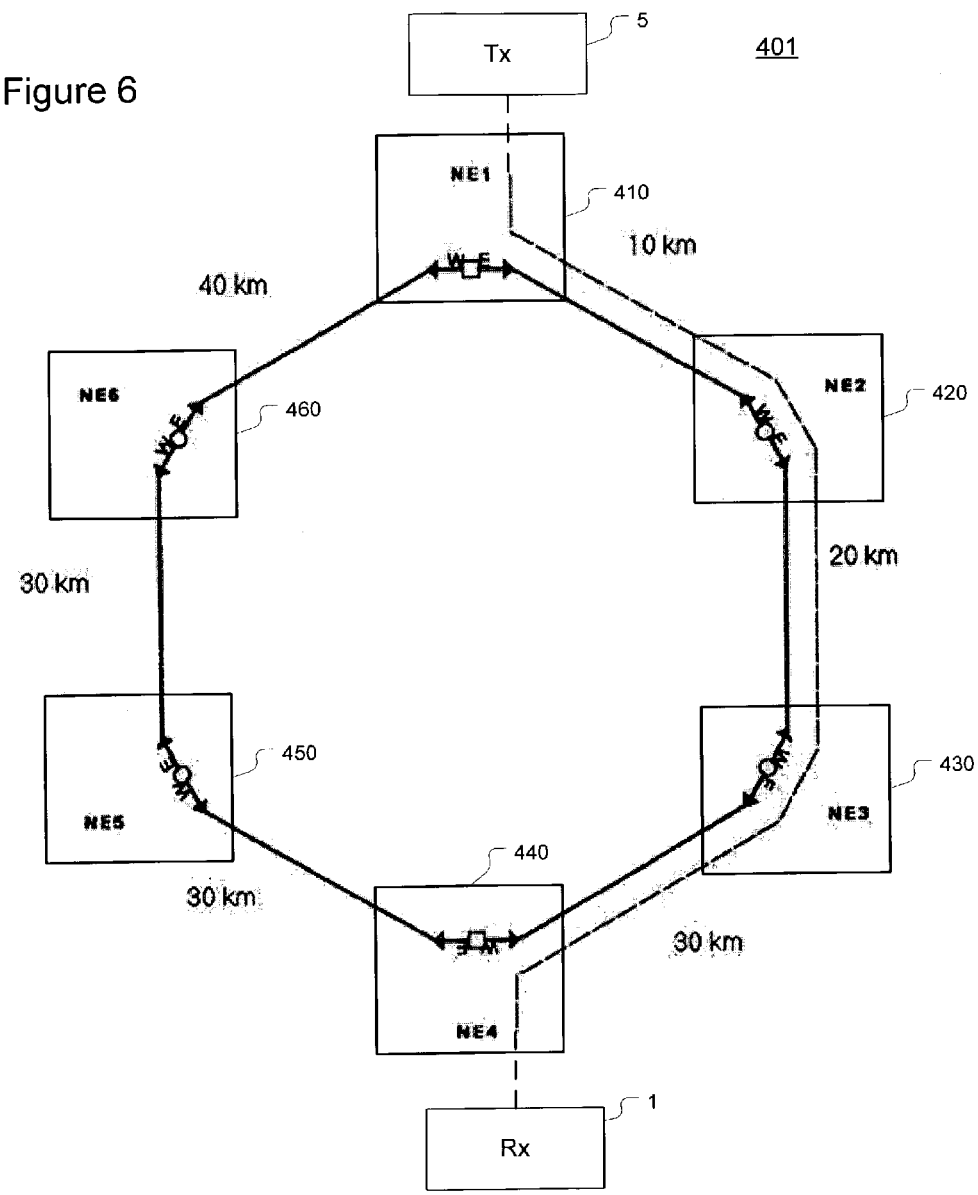
FIG. 6 is a very high-level block diagram showing a BLSR network in an un-switched state and to which the inventive optical receiver may be connected.
Figure 7:
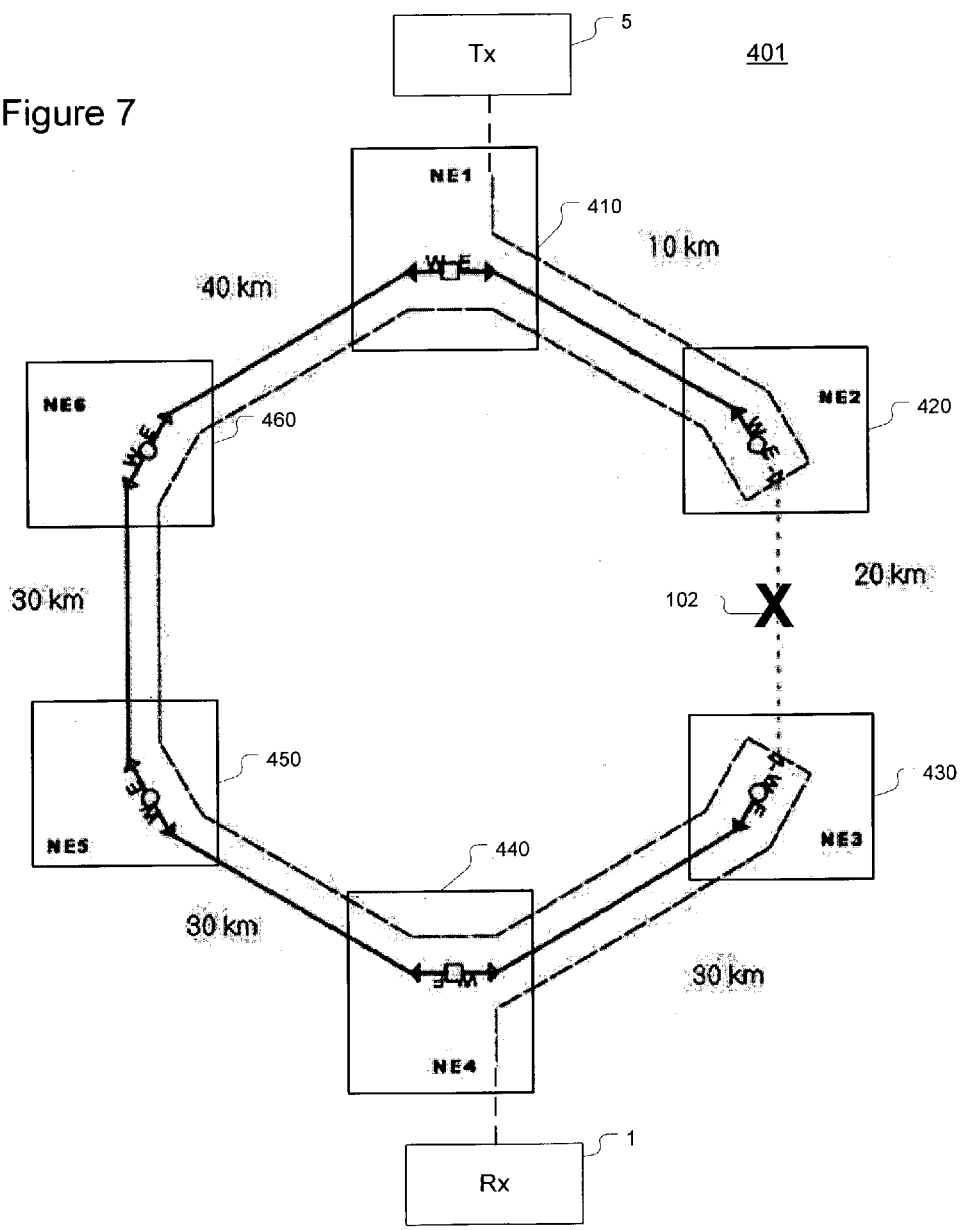
FIG. 7 is a very high-level block diagram showing a BLSR network in a switched state and to which the inventive optical receiver may be connected.

FIG. 6 is another example of an optical network 10 to which the inventive optical receiver 1 may be connected. In this example, the optical network is an example of an optical BLSR (bi-directional line switched ring).

BLSR networks are, in and of themselves, quite conventional. Indeed, Bellcore has set forth requirements and standards in, for example, Chapter 3 of Bellcore's GENERIC REQUIREMENTS GR-1230-CORE, Issue 1. For further details of a BLSR network please refer to U.S. Pat. Nos. 5,986,783 and 6,331,906 that are assigned to the assignee of the present application and which are hereby incorporated by reference in their entirety.

In general, a BLSR is a network for connecting a plurality of nodes by using transmission lines to form a ring wherein each two nodes thereof are connected by one path and, in the event of a failure occurring in a transmission line accommodating the path, a path route is changed to heal the path. The path route change is referred to as a "ring switch."

FIG. 6 illustrates a BLSR network 401 including network elements 410, 420, 430, 440, 450, and 460 which may be OADMs adapted for a BLSR as is known in the art. Distances between nodes are indicated merely to illustrate an example and not to limit the scope of the invention. BLSR networks may be constructed by connecting nodes with two fibers (a so-called "two-fiber BLSR") or with four fibers (a so-called "four-fiber BLSR). The inventive optical receiver 1 may be connected to a two-fiber or a four-fiber BLSR, for example.

As further shown in FIG. 6, the optical signal travels from transmitter 5 to network elements 420, 430 and arrives at network element 440 which drops the optical signal to the inventive optical receiver 1. When a failure 102 such as a fiber cut occurs, the BLSR performs a ring switch at network elements 420 and 430 to redirect the optical signal around the failure 102. The result is that the optical signal suddenly traverses a much longer distance and experiences a much greater loss and distortion than before. Thus, a significant change in eye quality will occur at the optical receiver 1.

In a UPSR or BLSR network, a fiber cut is detected by each receiver that loses its signal when the fiber is cut. When a signal is lost the performance monitor will see a continuous string of zeros and it will not detect the SONET framing pattern. This loss of signal or loss of frame gives an indication to the receiver that the service has been cut. When that occurs, the receiver forces the decision threshold to jump to the reference level.

The networks 10, 400, 401 may carry a single wavelength or multiple wavelengths (e.g. WDM (wavelength division multiplexed) utilizing a signaling format such as SONET (synchronous optical network), SDH (synchronous digital hierarchy), or GbE (gigabit Ethernet). The signal may utilize any such signaling format provided that it is a digital binary (On/Off) signal. The format and wavelength(s) utilized are largely irrelevant to the invention as the invention's purpose is to improve the reception of a separated (or single) wavelength. Such wavelength separation in a WDM system is a known technique that will not be described further here. It is sufficient to state that the receiver 1 receives an optical signal carrying the wavelength of interest from transmitter 5.

Figure 8:
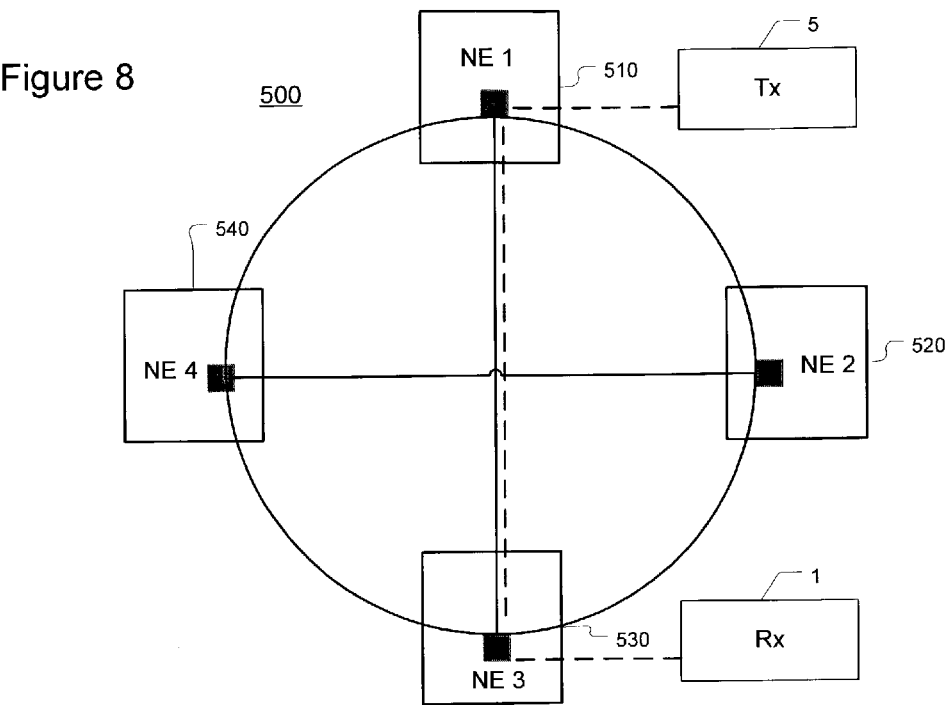
FIG. 8 is a very high-level block diagram showing an optical mesh network in an un-switched state and to which the inventive optical receiver may be connected.
Figure 9:
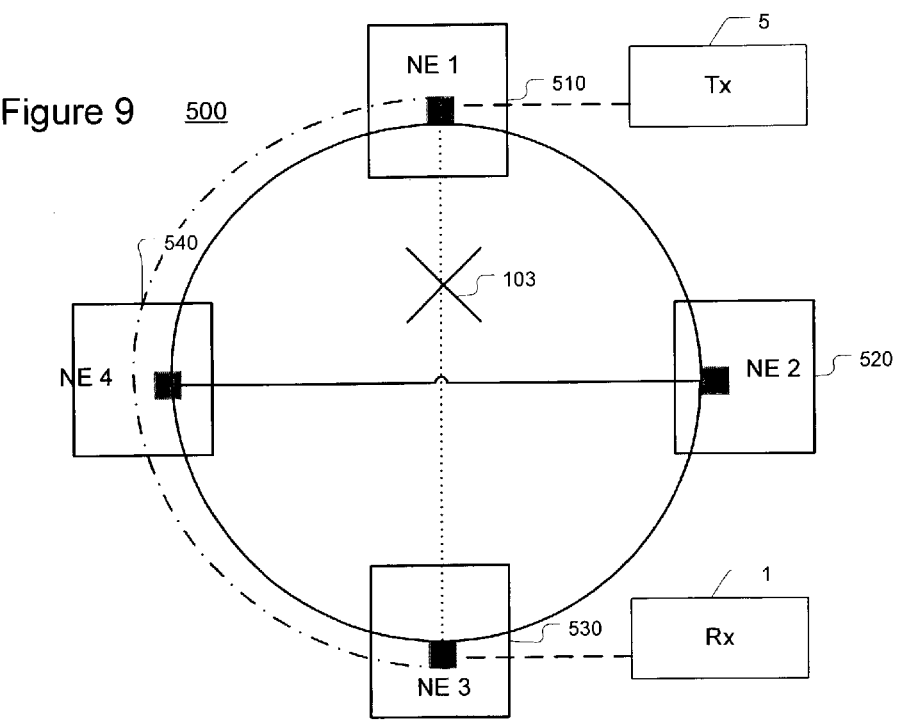
FIG. 9 is a very high-level block diagram showing an optical mesh network in a switched state and to which the inventive optical receiver may be connected.

Another type of optical network 10 to which the inventive optical receiver 1 may be connected is a optical mesh. FIGS. 8 and 9 are simplified diagrams of an optical mesh network 500 that include network elements 510, 520, 530, 540 that are interconnected as shown. A typical optical mesh is includes more nodes and connectivity but the illustration of FIGS. 8 and 9 is simplified so as to ease the explanation of the inventive concepts. At least some of the network elements 510-540 include optical switches that are capable of switching optical signals without converting them to an electrical signal.

In an optical mesh, there can exist several alternative lightpaths between a source and destination node. A mesh restoration algorithm switches the traffic onto an alternative path when a fault occurs. There are several proposed mesh restoration algorithms, e.g. U.S. Pat. No. 6,549,513 and U.S. Pat. No. 6,567,194. Details on mesh restoration are beyond the scope of this patent, but this patent can be used to improve the performance of an optical receiver in a mesh network where restoration is done optically. Regardless of the type of optical network restoration (UPSR, BLSR, or mesh), this invention can improve the performance of an optical receiver in the network when (a) the lightpath (and eye quality and received power) changes after a network fault and/or (b) a signal level changes when other signals are added or dropped. In all cases the receiver has a performance monitor, or power monitor that detects when the signal has been lost.

It is to be understood that the optical networks 400, 401, 500 shown in FIGS. 4-9 are non-limiting examples of the type of optical networks in which the invention may be incorporated. The size, number of nodes, OADMs configuration, connectivity and other factors may vary significantly and still benefit from the optical receiver 1 of the invention.

OPERATION OF INVENTION

The basic operational theory of the inventive optical receiver 1 is briefly introduced above. This section expands upon the inventive methodologies.

In general, the inventive optical receiver 1 includes three control loops: a first control loop is utilized when a condition of the optical network is in a steady-state or at least a substantially steady-state, a second and third control loops are utilized in response to the condition of the optical network experiencing a transient condition (either a non-channel disruptive transient or an alarm condition (channel-disruptive transient). Such a conditional response greatly improves the ability of the invention to not only tune the decision threshold towards an optimal value but also permits the inventive optical receiver to respond to transient conditions.

The first control loop generally includes the performance monitor 20, microprocessor 40, EEPOT 46, peak detector 48 and comparator 17 and utilizes performance monitoring data to tune the percentage amount value utilized by the EEPOT 26 to adjust the decision threshold.

The second control loop generally includes the port 80/and or performance monitor 20; the microprocessor 40, EEPOT 46, peak detector 48 and comparator and utilizes a "trigger" or "alarm condition" to switch the percentage amount utilized by the EEPOT 26 to suddenly adjust the decision threshold to a reference value in response to the trigger.

The third control loop generally includes the peak detector 48, EEPOT 46 and comparator 16 and utilizes the "fixed" percentage amount in the EEPOT to keep the decision threshold at a fixed percentage of optical signal peak power in order to respond to large transients (non-channel-disruptive transient). The "fixed" percentage may also be tuned according to the first control loop or switched to a reference value according to the second control loop.

Figure 12:
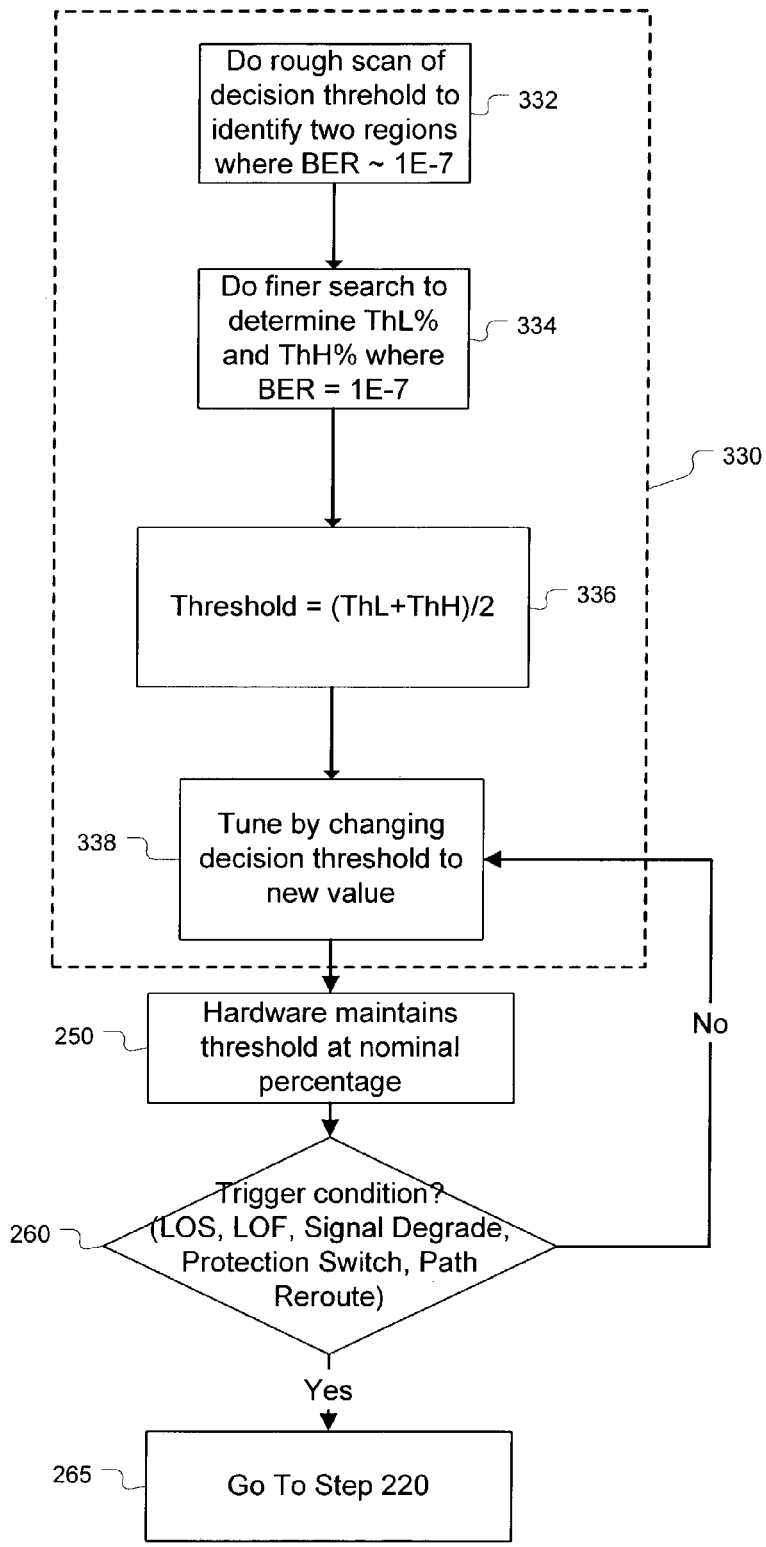
FIG. 12 is a mid-level flowchart illustrating a second alternative for performing the inventive threshold tuning algorithm.

The "alarm condition" or trigger for the second control loop includes a variety of events as shown in FIG. 12 such as LOS (loss of signal) 212, LOF (loss of frame) 213, a signal degrade alarm 214, a manual trigger from a craft interface (e.g. during maintenance or as part of an upgrade process) 216, a protection switch event 218, or a traffic reroute notification 219. When the microprocessor circuit 40 receives any one of these triggers the optical signal is undergoing a transient and action needs to be taken to compensate or the BER will increase to an unacceptable level.

The first control loop for a steady-state condition is preferably performed using a software control algorithm programmed into the microprocessor circuit 40. Since the first control loop essentially performs tuning of the decision threshold in an attempt to reach an optimum value during steady state conditions, the response time of the first control loop need not be fast. Indeed, it may be preferable to have a relatively slow response time to permit the system to stabilize before further tuning is performed. Moreover, the performance monitor 20 may take a relatively long time to update the error data that is used as the basis for tuning the decision threshold.

The second control loop depends upon a rapid response in order to recover the BER within acceptable parameters. One such parameter is the 50 ms recovery time specified in the SONET and SDH standards: after a protection switch or traffic reroute event, the optical signal must be successfully received with an acceptable BER. Otherwise, a major alarm will be raised and the affected optical signal traffic will be disrupted.

To enable such a rapid response time for the second control loop, the preferred embodiment relies upon a hardware-based control loop or interrupt-driven software-based control loop. This hardware-based control loop is essentially formed by the microprocessor circuit 40 receiving one of the triggers (described above) and immediately commanding a "safe" or reference decision threshold in response thereto. This may be performed by the microprocessor 40 commanding the EEPOT 46 to change the percentage amount of the peak value (from peak detector 48) that is used as the decision threshold for comparator 16. Since the peak value is already available and the EEPOT 46 response time is quite fast, the entire control loop may very rapidly respond to the protection switch. In this way, the link may be rapidly re-established after the transient event thereby providing a key advantage.

The implementation of the invention constructed by the inventors is able to recover, for example, within a few milliseconds to a BLSR optical switch. This is well within the 50 ms demanded by SONET and SDH. Thus, the inventors have proven a high degree of utility for the invention.

Furthermore, the third control loop depends upon an even more rapid response in order to maintain the BER within acceptable parameters during a transient event. One such parameter is the less than 100 μs response time needed to maintain the fractional threshold level as the received optical power goes through rapid changes due to network events on other channels in an optically amplified network. It is expected that the traffic going through an optical link connected to the inventive optical receiver 1 needs to maintain an acceptable BER since the optical signal being received by the receiver 1 is not itself being rerouted.

In other words and as explained above in relation to FIGS. 1b-g, the failure of a first subset of channels being commonly amplified by an amplifier together with a second subset of channels will cause transients in the second subset (the non-failing channels). The first subset may be rerouted and the receiver of the first subset will enjoy a protection switch time of 50 ms to recover. Not so for the second subset (which experiences a transient due to the first subset) of channels that is not rerouted and which does not enjoy a protection switch time. Thus, the receivers of the second subset will see a large transient in the second subset and must continue to receive the second subset with an acceptable BER and without the benefit of the protection switch time in which to recover (e.g. the receivers of the second subset must continue to receive the second subset throughout the transient event and within an acceptable BER or else an alarm will be raised and the customer will be dissatisfied). Therefore, the third control loop must be extremely fast in order to respond to transients while maintaining an acceptable BER.

To enable such a rapid response time for the third control loop, the preferred embodiment relies upon a complete hardware-based control loop without any triggering event. This hardware-based control loop is essentially formed by the peak detector circuit 48 providing a signal that is directly proportional to the received signal and that is converted by the EEPOT 46 to a fractional voltage that is used as the decision threshold for comparator 16. Since the peak value is already available and the EEPOT 46 response time is quite fast, the entire control loop may very rapidly respond to the transient condition. In this way, the link can be maintained during the transient event thereby providing a key advantage.

The implementation of the invention constructed by the inventors is able to maintain BER performance with response time of 20 μs with receiver power going through as much as an 8 dB change. This advance permits the construction of rings with large number of amplifiers with dynamic add and drop capability for channels. Thus, the inventors have further proven a high degree of utility for the invention.

Figure 10:
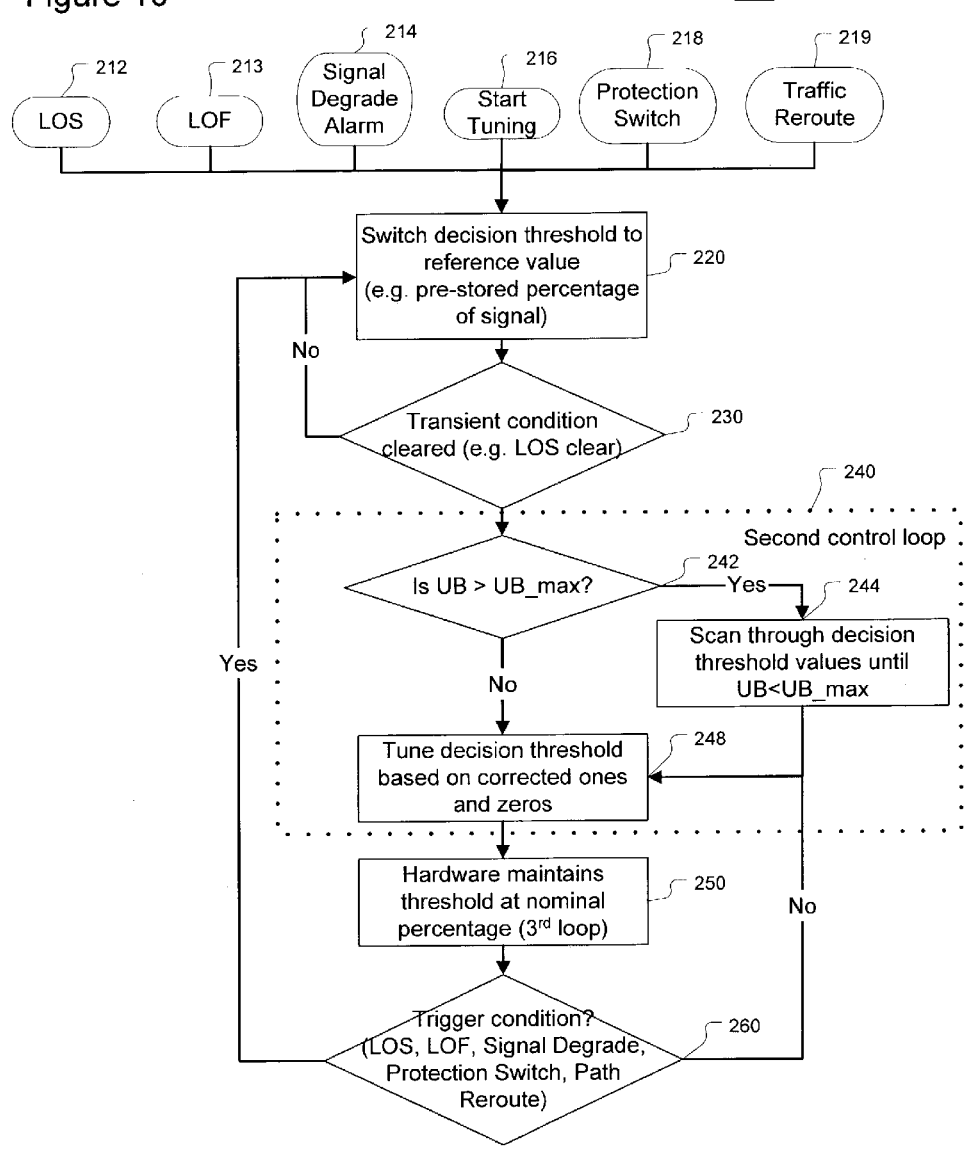
FIG. 10 is a high-level flowchart illustrating the inventive methodologies for changing the decision threshold.

FIG. 10 further illustrates the inventive methodology using a high-level flowchart. As shown therein, various trigger conditions that are indicative of a channel-disrupting transient condition cause the microprocessor to switch (220) the decision threshold to a reference default value. The trigger conditions (alarm conditions) include LOS (loss of signal) 212, LOF (loss of frame) 213, a signal degrade alarm 214, a manual trigger from a craft interface (e.g. during maintenance or as part of an upgrade process) 216, a protection switch event 218, and a traffic reroute notification 219.

The "safe" or reference decision threshold value is a predetermined value that is utilized by the microprocessor 40 to put the optical receiver in a mode such that it may quickly recover when the traffic is restored. The particular value used for this reference threshold value may be determined empirically particularly because optical networks vary widely in their configurations and equipment utilized. It is not uncommon for a wide variety of types optical transmitters 5 to be utilized in an optical network. Each type of transmitter 5 may be from a different manufacturer or may otherwise have a different launch power. Moreover, the diverse signal pathways may include a variety of attenuating and dispersive (e.g. chromatic or polarization mode dispersion are common issues in optical networks) elements. Thus, it is very difficult if not impossible to derive a reference threshold value that is generally applicable in all situations. In one particular network, the inventors arrived at a reference decision threshold value of 40% of the peak but it is to be understood that this example is not limiting in any way and that the particular value for a given network will need to be empirically derived. This can be determined, for example, by measuring a large set of transmitters and receivers under the "worst-case" conditions, e.g. longest fiber length, smallest allowed OSNR and received power, and determining the single reference threshold that minimizes errors for all transmitter/receiver pairs. Or different conditions can give different reference thresholds, which can be placed in a look-up table.

In one alternative, the LUT (look up table) 41 may be utilized to store a table of reference decision threshold values (or percent of peak values). This table may map transmitter type, network configuration, type of trigger, etc against default values. A network manager may inform the microprocessor unit (via port 80, for example) either before the transient event or as part of the notification (e.g. traffic reroute signal) as to the particulars so that the correct reference decision threshold may be chosen. For example, the microprocessor 40 may have access to a network topology map specifying the optical network configuration and utilizing that map to determine which reference decision threshold to utilize.

Alternatively, during channel set up in which the optical channel is provisioned or otherwise established between a particular transmitter and receiver, the microprocessor 40 could be informed of the type of transmitter it is talking to. Thus, the microprocessor 40 can use to LUT 41 to look up the appropriate reference decision threshold value for that transmitter.

After switching 220 to the reference decision threshold value, the invention then determines whether the transient condition has been cleared (e.g. is the LOS 212 now clear? or is the protection switch 218 event over?). If not, the reference decision threshold is maintained (illustrated as looping back to the switch 220 step). If the transient has been cleared, the invention then transitions to the second control loop 240 to tune the decision threshold to a more optimum value than the reference value.

The preferred implementation of the tuning algorithm 240 is shown in FIG. 12 and includes first determining whether the uncorrectable Blocks (UB) are greater than a maximum value (UB_max). The number of uncorrectable bits is part of the error data sent from the performance monitor 20 to the microprocessor circuit 40. Recall that the performance monitor may perform error correction (e.g. FEC). To the extent that the error correction algorithm is unable to correct bit errors, the UB count increases. If the number of uncorrectable bits is too large (UB>UB_max), then the invention starts scanning (244) through decision threshold values until UB<UB_max. This scan (244) essentially steps through a range of decision threshold values until the number of UBs falls within range. In other words, a coarse scan of decision thresholds is performed to find a decision threshold that meets minimum requirements.

Figure 11:
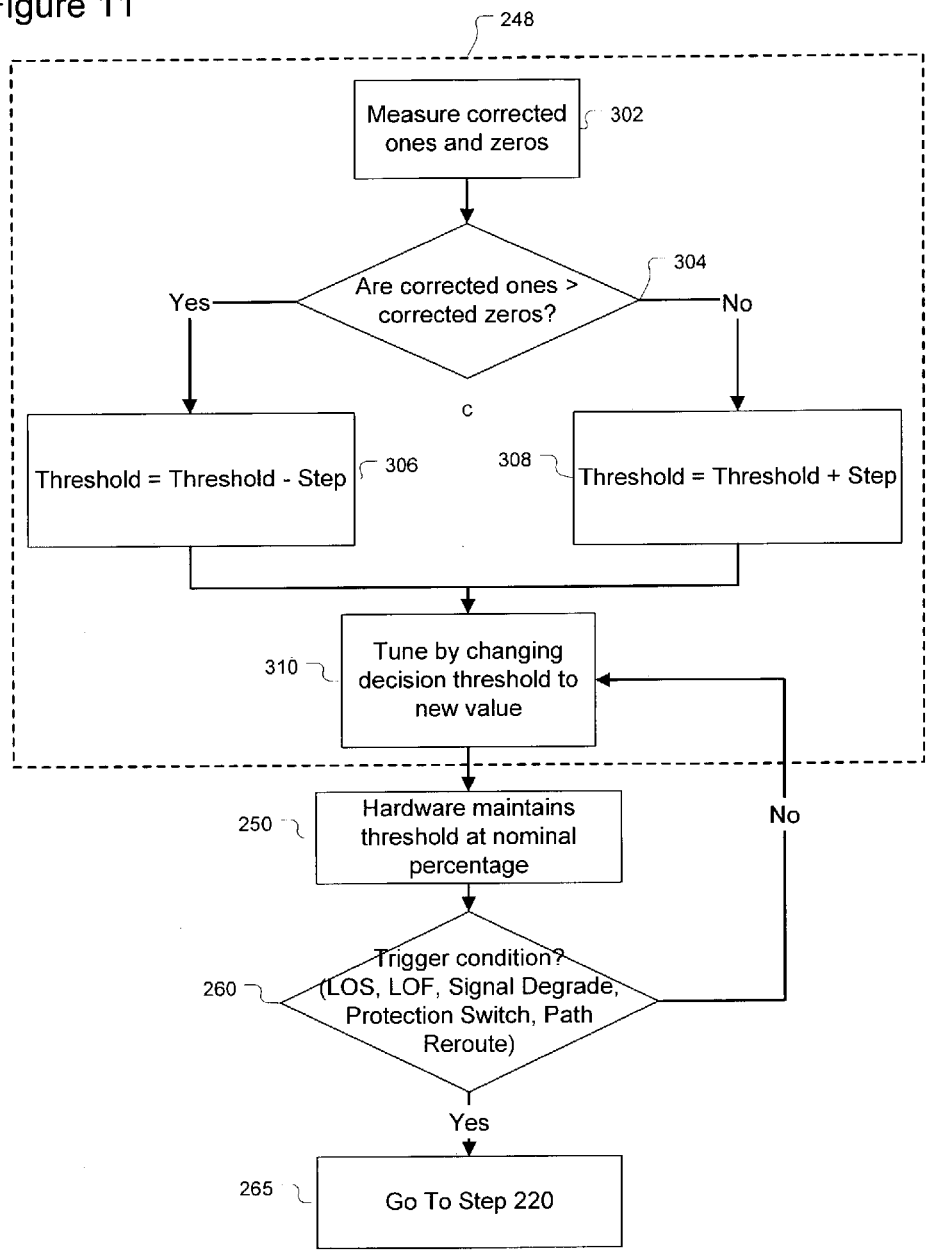
FIG. 11 is a mid-level flowchart illustrating one alternative for performing the inventive threshold tuning algorithm.

Once within range, the invention proceeds to tune the decision threshold based on the number of corrected "1"s and number of corrected "0"s. Some error correction algorithms, such as FEC, that may be utilized by the performance monitor count the number of corrected "1"s and number of corrected "0"s. The performance monitor 20 sends these counts as part of the error data to the microprocessor which then utilizes them to tune the decision threshold. In general, the number of corrected "1"s and number of corrected "0"s provides directionality information as to which direction to change the decision threshold and the invention uses this information to change the decision threshold accordingly. One such method of tuning based on corrected "1"s and number of corrected "0"s is shown in FIG. 11 and described in detail below.

After tuning 248, the inventive hardware (e.g. EEPOT 46, peak detector 48 and comparator 17) maintains 250 the decision threshold at the nominal value that results from the tuning 248. Because the system needs to stabilize and the performance monitor 20 needs time to update the error data, such a maintenance 250 of the decision threshold is advantageous and prevents "hunting", overshooting, and undershooting.

Figure 10B:
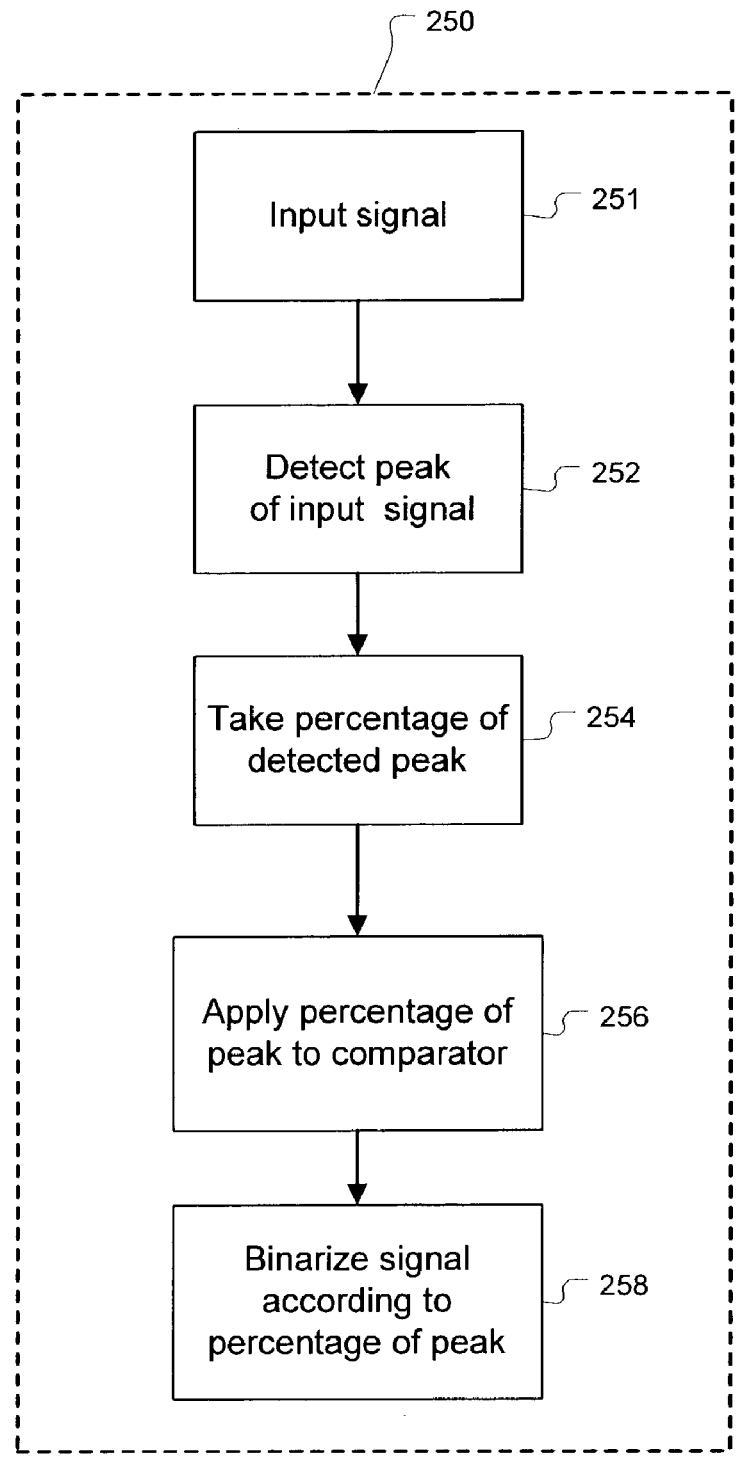
FIG. 10*b* is a mid-level flowchart illustrating the inventive methodologies for changing the decision threshold.

Step 250 also represents the generalized operation of the third control loop 250 that is described above. FIG. 10b shows more detail of the third control loop 250 in flowchart form. As shown, the third control loop inputs 251 the signal (e.g. the O/E converted optical signal) and detects 252 the peak. The peak detection 252 may be performed by the peak detector 48. Next, the invention applies a percentage value to the peak (take a percentage of the peak) which is a step that may be performed by the EEPOT 46. The signal may then be binarized (quantized into two levels) 258 according to the percentage of peak that is being applied 256 as a decision threshold. This binarization may be performed by the comparator 16. All of these steps are performed by hardware elements 16, 46, 48 and are able to react on a very fast time scale to a transient.

The invention then determines 260 whether a transient trigger condition has occurred that directly affects the channel being received (as opposed to indirect affects caused by, for example, loss of one channel being commonly amplified with channels such that those other channels thereby experience an indirect effect). The triggers indicating such a transient are the same as above and include LOS (loss of signal) 212, LOF (loss of frame) 213, a signal degrade alarm 214, a manual trigger from a craft interface (e.g. during maintenance or as part of an upgrade process) 216, a protection switch event 218, and a traffic reroute notification 219 all of which directly affect the channel being received. If such a trigger has not occurred, then the invention continues tuning 248 as shown in the loop back of FIG. 10.

On the other hand, if the transient trigger has occurred, the invention switches 220 to the reference decision threshold value to compensate. The flow continues as described above.

FIG. 11 illustrates one way in which the invention may tune 248 the decision threshold based on the number of corrected "1"s and number of corrected "0"s. As shown, a measurement 302 of the number of corrected "1"s and number of corrected "0"s is performed by the performance monitor 20 utilizing, for example, an FEC algorithm. If the number of corrected "1"s>number of corrected "0"s then the threshold is increased 308; otherwise, the threshold is decreased 306. The microprocessor 40 may then change 310 the decision threshold to the updated value in the manner described above. The rest of FIG. 11 shows the tuning 248 process in context with the remainder of the main algorithm. Since the main algorithm has already been described above it will not be repeated here.

Alternatively, the tuning 248 process may utilize other specific algorithms. For example, copending applications (Ser. No. 09/916,367 filed Jul. 27, 2001 and 09/916,867 filed Jul. 27, 2001) are hereby incorporated by reference in their entirety. These applications describe various ways to tune a decision threshold according to the number of corrected "1"s and number of corrected "0"s. All of these alternative tuning algorithms may be utilized by the present invention to perform the tuning 248 process.

FIG. 12 shows another alternative to the tuning 248 process and may be substituted therefore. Tuning process 330 is not tied to any particular algorithm used by the performance monitor 20 to detect and/or correct errors. Instead, the alternative tuning process 330 first performs a coarse or rough scan (large step size) of the decision thresholds in a manner similar to scanning step 244 described above but, in this case, to identify two regions where the BER is around 1E-7 or less. This identifies two boundaries of an area where an acceptable decision threshold may be found, between ThH % and ThL %. A fine search 226 is then performed over the boundary region using a smaller step size than the coarse scan 332 and to identify the upper (ThH %) and lower (ThL %) bounds where the BER=1E-7. It is to be understood that 1E-7 is a non-limiting example based on empirical analysis of a particular network configuration. The remainder of FIG. 12 shows the tuning 330 process in context with the main algorithm of FIG. 10. Since the main algorithm has already been described above it will not be repeated here.

Figure 13:
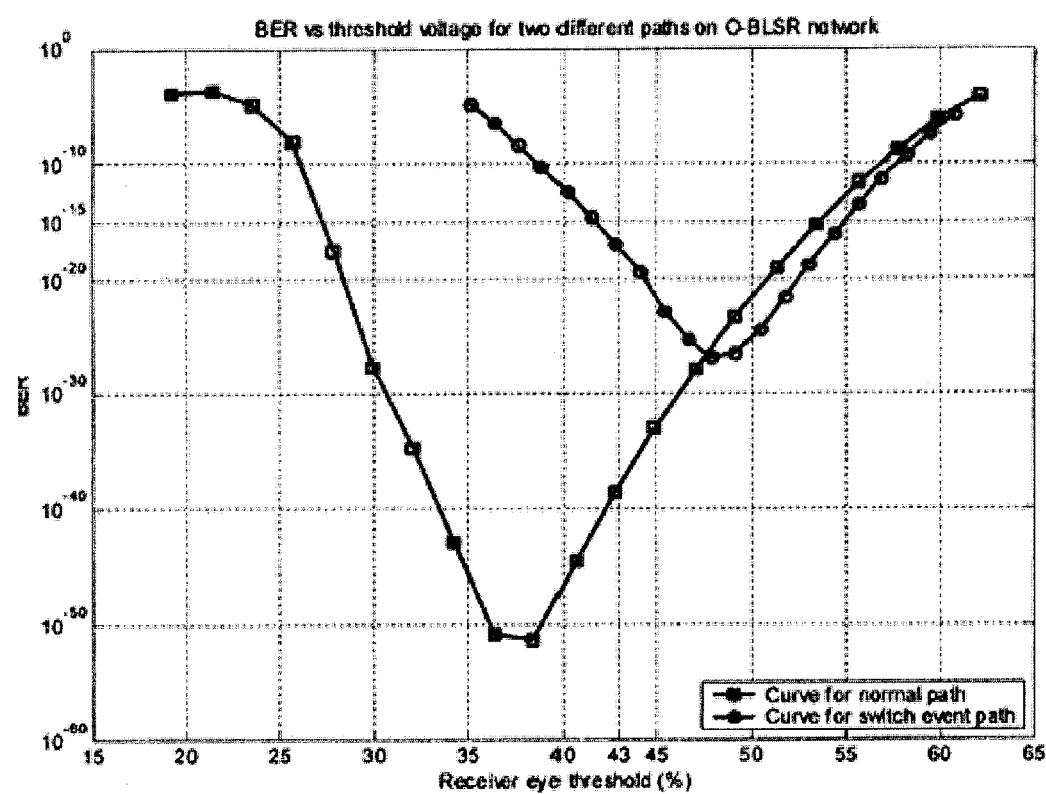
FIG. 13 is a graph of BER versus decision threshold (in % of peak) for an optical signal traversing a normal (un-switched) path and a switched or alternative signal pathway.

FIG. 13 further illustrates the inventive concepts. FIG. 13 is a graph of BER versus decision threshold (in % of peak). Two curves are shown: the curve labeled by the square corresponds to an optical signal arriving at the receiver 1 over a normal (un-switched path) which the curve labeled by the square corresponds to that same optical signal arriving over a different (switched) path. As can be seen the minimum BER point is substantially different (approx. 48% versus approx. 37% for the switched versus un-switched paths). If the un-switched value of 37% were simply maintained after the switch event as in the conventional system, the result would be a BER of over 1E-10, which is unacceptably high. The inventive switch to a reference threshold value upon switch event significantly lowers this BER in a very short time span and well within the 50 ms demanded by SONET. Thereafter, this reference decision threshold may be tuned to a more optimum value as described above.

Figure 14:
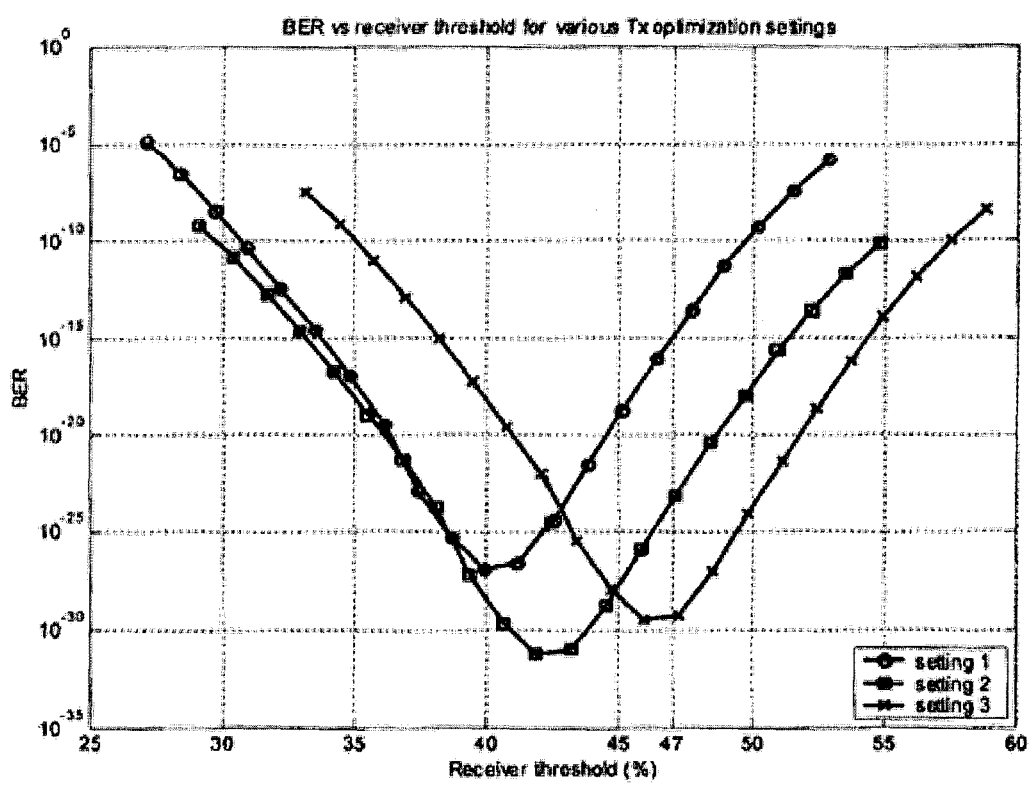
FIG. 14 is a graph showing the BER versus decision threshold (in % of peak) for various transmitters.

FIG. 14 illustrates the advantages of using a lookup table 41 to store a table of reference decision thresholds for a range of transmitters. More particularly, FIG. 14 shows the BER versus decision threshold (in % of peak) for various transmitters. As can be seen, the minimum BER occurs at different threshold values. By selecting decision threshold according to transmitter type via the LUT 41, the invention improves performance.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of adjusting a decision threshold in an optical receiver having a photodetector converting an optical signal received from an optical network to an electrical input data signal and a comparator comparing the electrical input data signal to a decision threshold to provide a binary output data signal, the method comprising:
   detecting a peak value of an optical signal received from an optical network with a peak detector operatively connected to a photodetector;
   outputting a decision threshold to a comparator that is a commanded percentage of the peak value, wherein the outputting step is performed by an EEPOT operatively connected to said peak detector, a controller, and said comparator;
   commanding said EEPOT with a percentage value to tune the decision threshold and switch the decision threshold to a predetermined reference value, wherein said commanding step is performed by said controller;
   maintaining the decision threshold to be a fraction of the power of the optical signal, wherein the maintaining step is performed by said controller, and said controller is operatively connected to said comparator; and
   switching the decision threshold from a current value to the predetermined reference value when the optical signal experiences an alarm condition; and
   tuning the decision threshold with the controller according to an optimization control loop when the optical signal is in a substantially steady state condition.

2. The method of adjusting a decision threshold in an optical receiver according to claim 1, further comprising:
   performance monitoring the electrical input data signal to detect a loss of signal condition, a loss of frame condition, or a signal degrade condition relative to the optical signal,
   wherein the alarm condition is determined based on a result of said performance monitoring.

3. The method of adjusting a decision threshold in an optical receiver according to claim 1, wherein the optical network is a UPSR or BLSR network having a protection switch function that routes the optical signal over a different optical path to the optical receiver, the method further comprising:
   detecting a protection switch condition relative to the optical signal,
   wherein the alarm condition is determined according to said detecting step detecting the protection switch condition.

4. The method of adjusting a decision threshold in an optical receiver according to claim 1, wherein the optical network is an optical mesh network including optical switches capable of rerouting the optical, signal over a different optical path to the optical receiver, the method further comprising:
   receiving a traffic reroute notification signal relative to the optical signal, wherein the alarm condition is determined according to said receiving step receiving the traffic reroute notification signal.

5. The method of adjusting a decision threshold in an optical receiver according to claim 1, further comprising:
   returning to said tuning step when the alarm condition is no longer present.

6. The method of adjusting a decision threshold in an optical receiver according to claim 1, wherein the optimization control loop performed by said tuning step further comprises:
   detecting errors in the optical signal and outputting error data indicating errors in the optical signal, and
   tuning the decision threshold based on the error data.

7. The method of adjusting a decision threshold in an optical receiver according to claim 6, said detecting errors step detecting errors based on parity information included in the optical signal.

8. The method of adjusting a decision threshold in an optical receiver according to claim 6, said detecting errors step detecting errors based on SONET B1, B2, and/or B3 errors in the optical signal.

9. The method of adjusting a decision threshold in an optical receiver according to claim 1, further comprising:
   detecting and correcting errors in the optical signal and outputting error data indicating corrected errors in the optical signal,
   said tuning step tuning the decision threshold based on the error data.

10. The method of adjusting a decision threshold in an optical receiver according to claim 9,
   said detecting and correcting errors step utilizing a forward error correction algorithm, wherein the error data indicating corrected errors includes a number of corrected "1"s and a number of corrected "0"s,
   said tuning step tuning the decision threshold based on the number of corrected "1"s and a number of corrected "0"s.

11. The method of adjusting a decision threshold in an optical receiver according to claim 1, wherein said switching step is performed faster than said tuning step.

12. The method of adjusting a decision threshold in an optical receiver according to claim 1, further comprising:
   storing a percentage value,
   wherein the predetermined reference value is determined by taking a percentage of the peak value.

13. The method of adjusting a decision threshold in an optical receiver according to claim 1, further comprising:
   storing a table relating percentage values to network configurations,
   determining the type of network configuration transmitting the optical signal to the optical receiver;
   using the stored table to determine a percentage value for the type of network configuration determined by said determining step;
   wherein the predetermined reference value is determined by taking the percentage value of the peak value.

14. The method of adjusting a decision threshold in an optical receiver according to claim 1, further comprising:
   scanning a range of decision thresholds when and until the error data indicates that a number of uncorrectable blocks exceeds a error threshold value in order to determine a range of acceptable decision threshold values, said tuning step tuning the decision threshold based on the error data within the range of acceptable decision threshold values.

15. A control method for controlling the decision threshold of an optical receiver connected to an optical network, comprising:

a first control loop for tuning a decision threshold when a condition of an optical network is in a substantially steady-state, wherein the first control loop is performed by a performance monitor, a microprocessor, an EEPOT, a peak detector, and a comparator, and wherein the first control loop utilizes data from the performance monitor to calculate a percentage amount value utilized by the EEPOT to adjust the decision threshold;

a second control loop for switching the decision threshold to a predetermined reference value in response to the condition of the optical network experiencing a transient condition, wherein the second control loop is performed by the performance monitor, the microprocessor, the EEPOT, the peak detector, and the comparator, and wherein the second control loop utilizes the transient condition to switch the percentage amount value utilized by the EEPOT to suddenly adjust the decision threshold to the predetermined reference value responsive to the transient condition; and a third control loop for maintaining the decision threshold to be a fraction of the input optical signal power, wherein the third control loop is performed by the peak detector, the EEPOT, and the comparator, and wherein the third control loop utilizes a fixed percentage amount in the EEPOT to keep the decision threshold at the fraction of the input optical signal power in order to respond to large transients, wherein the first control loop is performed utilizing a software-based control algorithm and wherein the second and third control loops are performed utilizing hardware-based control algorithms.

16. The control method for controlling the decision threshold of an optical receiver according to claim 15, wherein the second control loop operates on a time scale that is shorter than a time scale of said first control loop.

17. The control method for controlling the decision threshold of an optical receiver according to claim 15, wherein the third control loop operates on a time scale that is shorter than a time scale of said second control loop.

18. An optical signal receiver, comprising:

a photodetector optically coupled to a fiber optic network;

said photodetector converting an optical signal received from the fiber optic network to an electrical input data signal;

a comparator operatively coupled to said photodetector and to a decision threshold input port;

said comparator comparing the electrical input data signal to a decision threshold to provide a binary output data signal; and a controller operatively connected to said comparator, a peak detector operatively connected to said photodetector, said peak detector detecting a peak value of the optical signal received from the optical network, an EEPOT operatively connected to said peak detector, said controller, and said comparator, said EEPOT outputting the decision threshold to the comparator that is a commanded percentage of the peak value;

said controller commanding said EEPOT with a percentage value to tune the decision threshold and switch the decision threshold to a predetermined reference value, said controller maintaining the decision threshold to be a fraction of the power of the optical signal, said controller switching the decision threshold from a current value to the predetermined reference value when the optical signal experiences an alarm condition, and said controller tuning the decision threshold according to an optimization control loop when the optical signal is in a substantially steady state condition.

19. The optical signal receiver according to claim 18, further comprising:

a performance monitor operatively connected to said comparator, said performance monitor detecting a loss of signal condition, a loss of frame condition, or a signal degrade condition relative to the optical signal, wherein the alarm condition is determined according to said performance monitor detecting the loss of signal condition, the loss of frame condition, or the signal degrade condition.

20. The optical signal receiver according to claim 18, wherein the optical network is a UPSR (unidirectional path switched ring) or a BLSR (bidirectional line switched ring) network having a protection switch function that routes the optical signal over a different optical path to the optical receiver, the optical receiver further comprising:

a performance monitor operatively connected to said comparator, said performance monitor detecting a protection switch condition relative to the optical signal, wherein the alarm condition is determined according to said performance monitor detecting the protection switch condition.

21. The optical signal receiver according to claim 18, wherein the optical network is an optical mesh network including optical switches capable of rerouting the optical signal over a different optical path to the optical receiver, said controller including a port adapted to receive a traffic reroute notification signal, wherein the alarm condition is determined according to said receiving step receiving the traffic reroute notification signal.

22. The optical signal receiver according to claim 18, said controller tuning the decision threshold according to the optimization loop when the alarm condition is no longer present.

23. The optical signal receiver according to claim 18, further comprising:

a performance monitor operatively connected to said comparator, said performance monitor detecting errors in the digital output data signal and outputting error data indicating errors in the optical signal;

said controller tuning the decision threshold based on the error data as part of the optimization control loop.

24. The optical signal receiver according to claim 23, further comprising:

said performance monitor detecting errors based on parity information included in the optical signal.

25. The optical signal receiver according to claim 23, further comprising:

said performance monitor detecting errors based on SONET B1, B2, B3 errors in the electrical data signal.

26. The optical signal receiver according to claim 18, said performance monitor detecting and correcting errors in the electrical data signal and outputting error data indicating corrected errors, said controller tuning the decision threshold based on the error data.

27. The optical signal receiver according to claim 26, said performance monitor utilizing a forward error correction algorithm, wherein the error data indicating corrected errors includes a number of corrected "1"s and a number of corrected "0"s,
said controller tuning the decision threshold based on the number of corrected '1's and a number of corrected "0"s.

28. The optical signal receiver according to claim 18, further comprising:
a peak detector operatively connected to said photodetector, said peak detector detecting a peak value of the optical signal received from the optical network,
a multiplying DAC operatively connected to said peak detector, said controller, and
said comparator, said multiplying DAC outputting the decision threshold to the comparator that is a commanded percentage of the peak value;
said controller commanding said multiplying DAC with a percentage value to tune the decision threshold and switch the decision threshold to the predetermined reference value.

29. The optical signal receiver according to claim 18, further comprising:
a look-up table operatively connected to said controller;
said look-up table storing a table relating percentage values to network configurations,
said controller determining the configuration of the network transmitting the optical signal to the optical signal receiver;
said controller using said look-up table to determine a percentage value for the network configuration so determined;
said controller using the determined percentage value as the percentage value to switch the decision threshold to the predetermined reference value.

30. The optical signal receiver according to claim 18, wherein the network configuration includes optical transmitter type,
said controller determining the type of optical transmitter transmitting the optical signal to the optical signal receiver, said controller using said look-up table to determine the percentage value for the optical transmitter type so determined.

* * * * *